United States Patent [19]

Marley

[11] Patent Number: 4,783,807
[45] Date of Patent: Nov. 8, 1988

[54] SYSTEM AND METHOD FOR SOUND RECOGNITION WITH FEATURE SELECTION SYNCHRONIZED TO VOICE PITCH

[76] Inventor: John Marley, 8715 E. Mackenzie Dr., Scottsdale, Ariz. 85251

[21] Appl. No.: 844,769

[22] Filed: Aug. 27, 1984

[51] Int. Cl.$^4$ ............................................. G10L 5/00
[52] U.S. Cl. ................................................. 381/43
[58] Field of Search ........................... 381/38, 41–45, 381/49; 364/513.5

[56] References Cited

U.S. PATENT DOCUMENTS

| | | | |
|---|---|---|---|
| 2,635,146 | 4/1953 | Steinberg | 381/38 |
| 3,197,560 | 7/1965 | Riesz | 381/38 |
| 3,278,685 | 10/1966 | Harper | 179/1 |
| 3,416,080 | 12/1968 | Wright et al. | 324/77 |
| 3,479,460 | 11/1969 | Clapper | 179/1 |
| 3,485,951 | 12/1969 | Hooper, Jr. | 179/1 |
| 3,488,446 | 1/1970 | Miller | 179/15.55 |
| 3,499,989 | 3/1970 | Cotterman et al. | 179/1 |
| 3,499,990 | 3/1970 | Clapper | 179/1 |
| 3,573,612 | 4/1971 | Scarr | 324/77 |
| 3,603,738 | 9/1971 | Focht | 179/1 |
| 3,617,636 | 11/1971 | Ogihora | 179/1 |
| 3,646,576 | 2/1972 | Thurston | 179/1 |
| 3,742,146 | 6/1973 | Newman et al. | 179/1 |
| 3,770,892 | 11/1973 | Clapper | 179/1 |
| 3,916,105 | 10/1975 | McCray | 179/1.5 |
| 3,946,157 | 3/1976 | Dreyfus | 179/1 |
| 4,284,846 | 8/1981 | Marley | 381/45 |
| 4,343,969 | 8/1982 | Kellett | 179/1 |

*Primary Examiner*—Emanuel S. Kemeny
*Attorney, Agent, or Firm*—Cahill, Sutton & Thomas

[57] ABSTRACT

Speech signals are transformed into phoneme identification signals which represent the first two positive slope durations following the maximum peak amplitude of a pitch cycle.

40 Claims, 11 Drawing Sheets

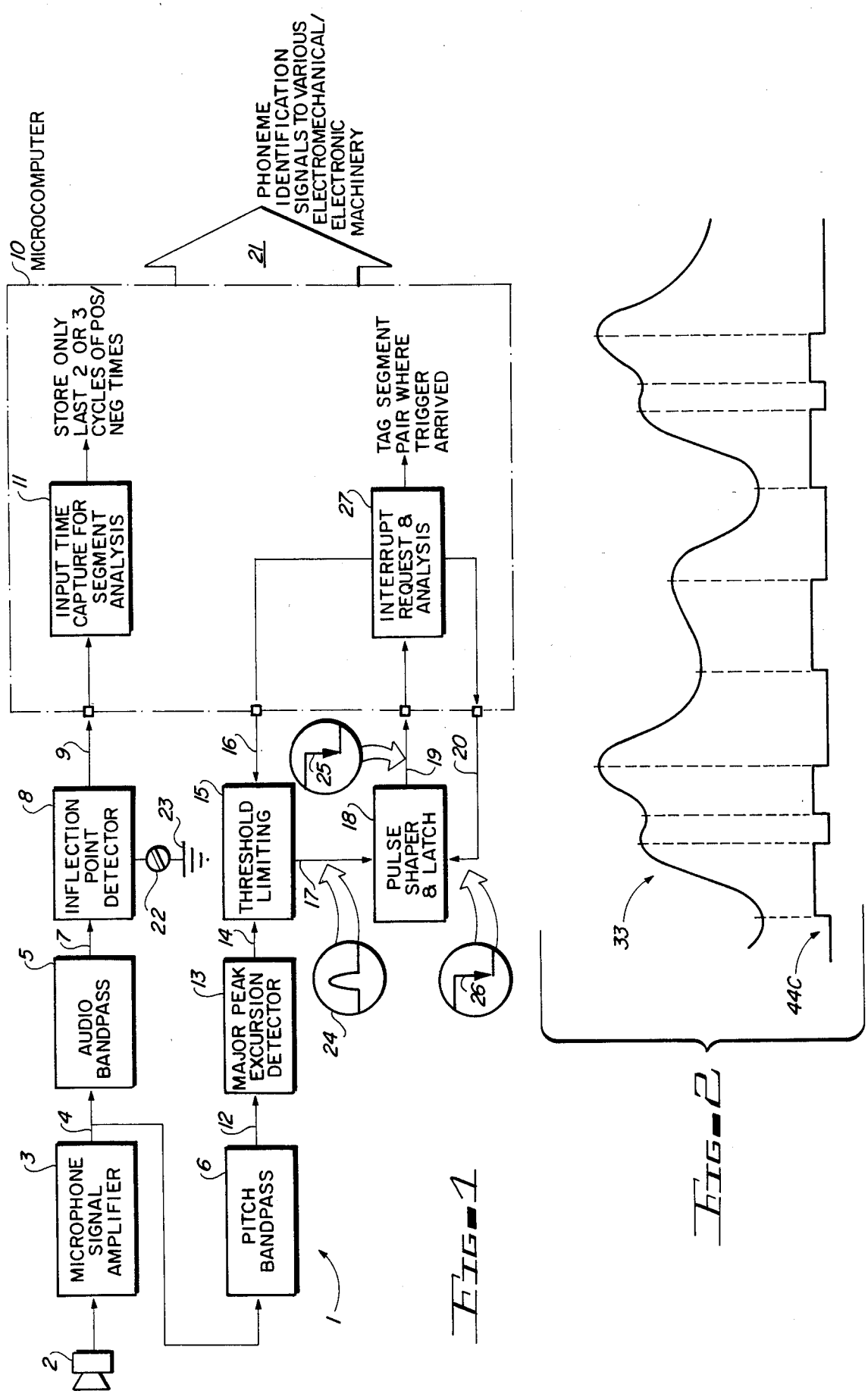

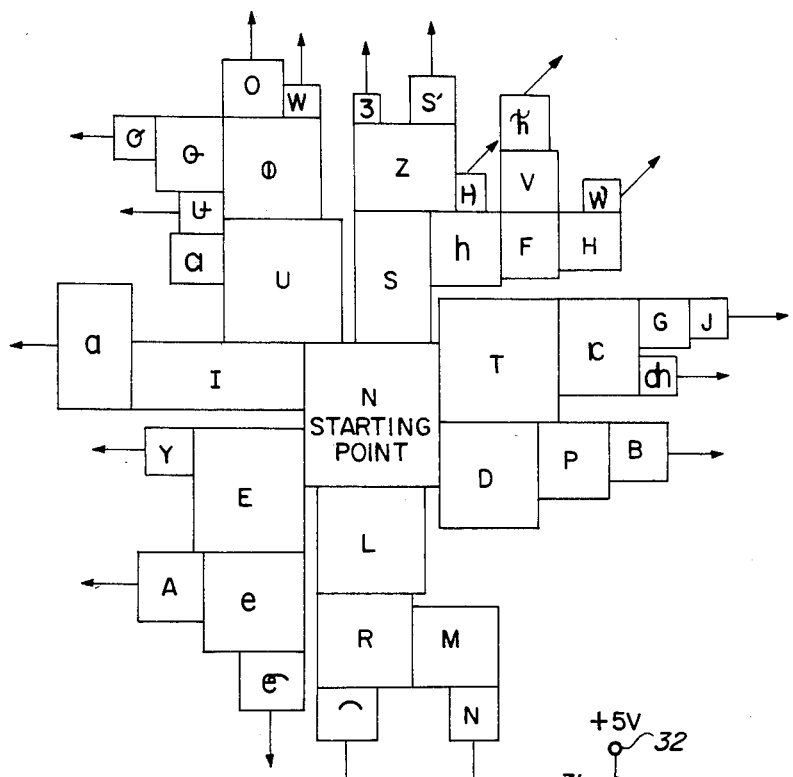
_Fig-3_
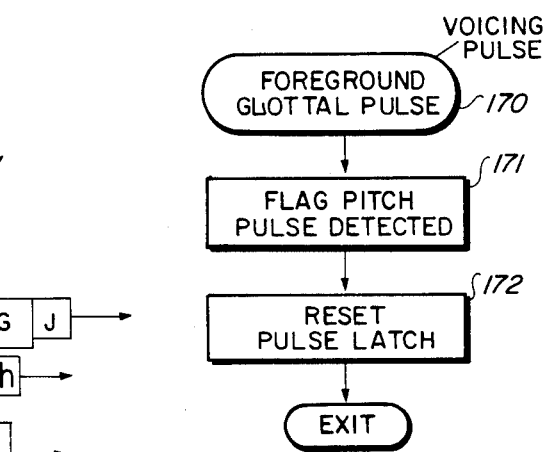
_Fig-15_
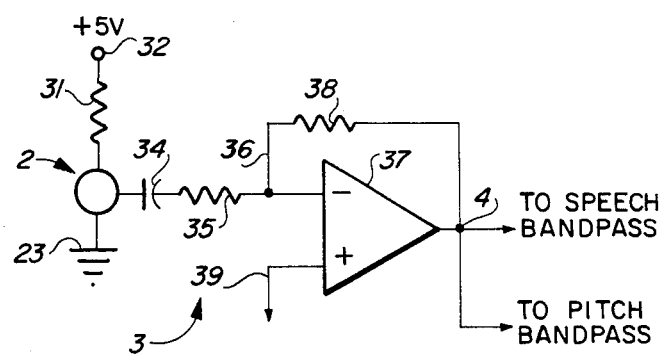
_Fig-4_
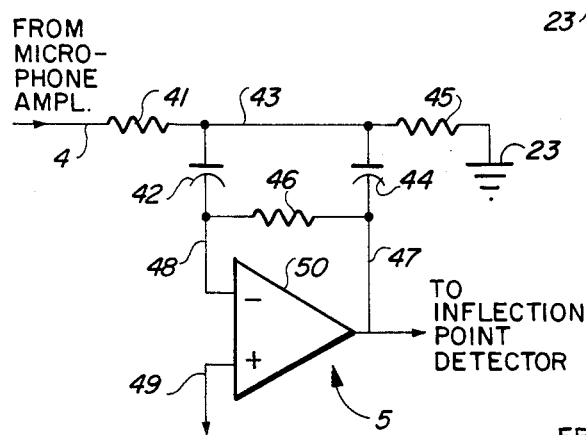
_Fig-5_
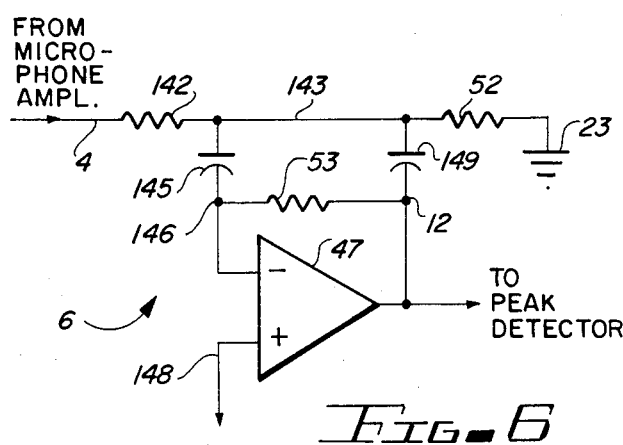
_Fig-6_

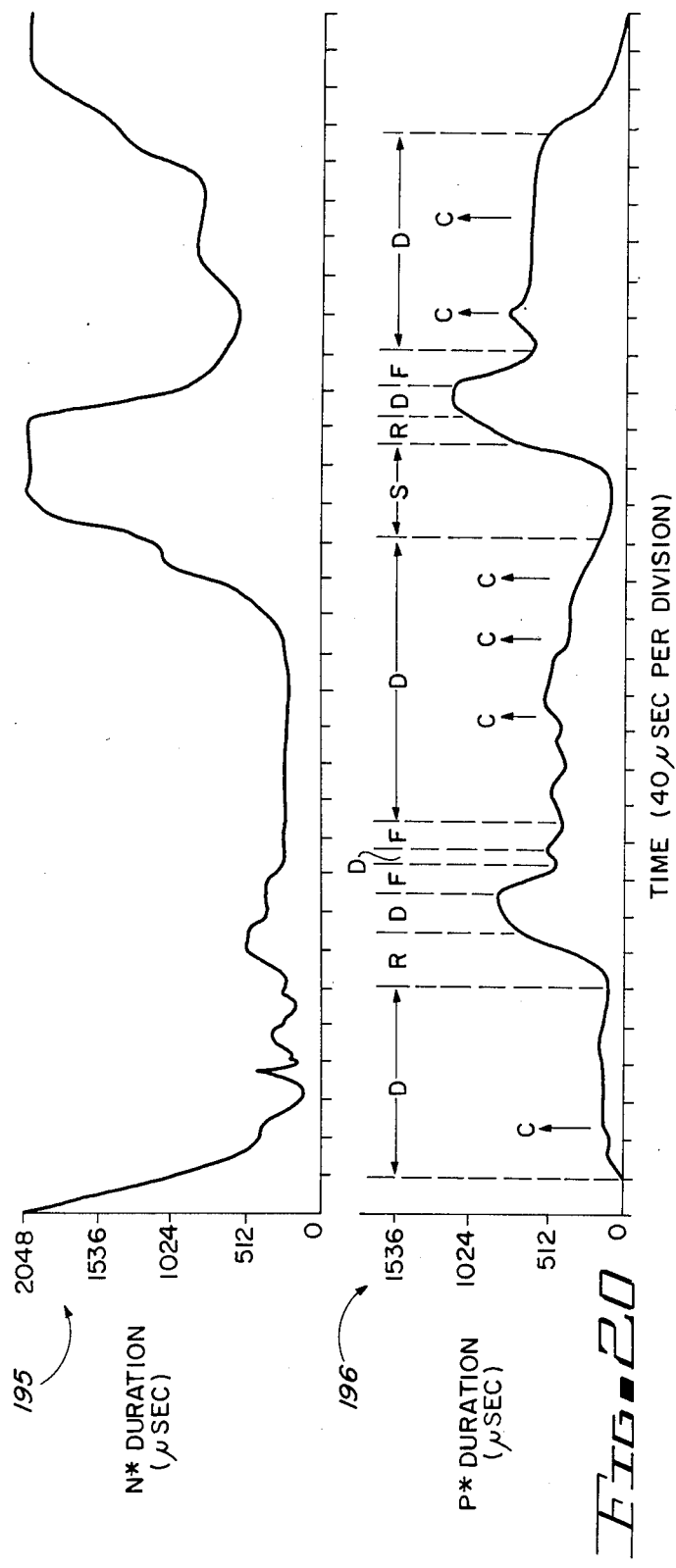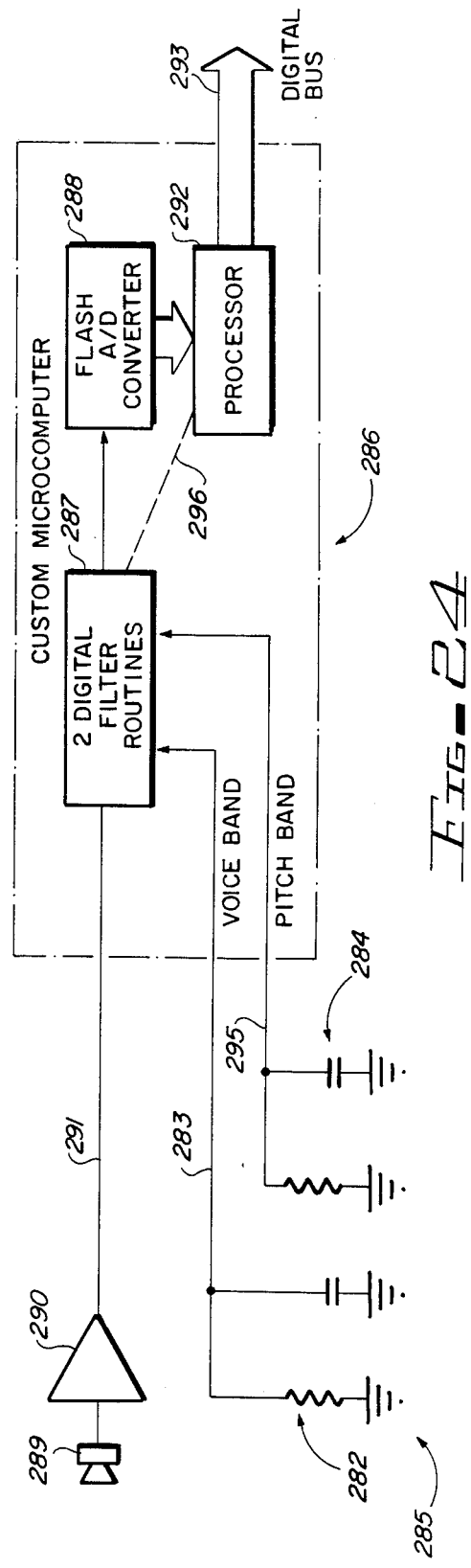

SYSTEM AND METHOD FOR SOUND RECOGNITION WITH FEATURE SELECTION SYNCHRONIZED TO VOICE PITCH

BACKGROUND OF THE INVENTION

The invention relates to systems and methods for speaker indepedent continuous and connected speech recognition and characteristic sound recognition, and more particularly to sytems and methods for dealing with both rapid and slow transitions between phonemes and characteristic sounds, and for dealing with silence and distinguishing between certain closely related phonemes and characteristic sounds, and for processing the phonemic recognition in real time.

In recent years there has been a great deal of research in the area of voice recognition because there are numerous potential applications for a reliable, low-cost voice recognition system. The following references are illustrative of the state of the art:

| U.S. Pat. No. 3278685 | Harper | 1966 | IBM |
| U.S. Pat. No. 3416080 | Wright | 1966 | SEC (UK) |
| U.S. Pat. No. 3479460 | Clapper | 1969 | IBM |
| U.S. Pat. No. 3485951 | Hooper | 1969 | Private |
| U.S. Pat. No. 3488446 | Miller | 1970 | Bell |
| U.S. Pat. No. 3499989 | Cotterman | 1970 | IBM |
| U.S. Pat. No. 3499990 | Clapper | 1970 | IBM |
| U.S. Pat. No. 3573612 | Scarr | 1968 | STC |
| U.S. Pat. No. 3603738 | Fecht | 1971 | Philco |
| U.S. Pat. No. 3617636 | Ogihara | 1971 | NEC (Japan) |
| U.S. Pat. No. 3646576 | Griggs | 1970 | Private |
| U.S. Pat. No. 374214 | Newman | 1970 | NRDC (UK) |
| U.S. Pat. No. 3770892 | Clapper | 1972 | IBM |
| U.S. Pat. No. 3916105 | McCray | 1975 | IBM |
| U.S. Pat. No. 3946157 | Dreyfus | 1976 | Private |
| U.S. Pat. No. 4343969 | Kellet | 1982 | Trans-Data Assoc |

As mentioned in my prior U.S. Pat. No. 4,284,846, many problems still remain to be solved in speech recognition, and include the normalization of speech signals to compensate for amplitude and pitch variations in speech by different persons, obtaining of reliable and efficient parametric representation of speech signals for processing by digital computers, identifying and utilizing the demarcation points between adjacent phonemes, identifying the onset of each voiced pitch cycle, identifying of very short duration phonemes, and ensuring that the speech recognition system can adapt to different speakers or new vocabularies.

The system described as a preferred embodiment in my previous U.S. Pat. No. 4,284,846 represents a major step forward in the evolution of speech and sound recognition systems, in that it shows that a system with very little hardware, including a single, low-cost integrated circuit microprocessor, can achieve real time recognition of spoken phonemes Furthermore, the system described in that patent is relatively speaker-independent.

However, my subsequent research has shown that the system described in U.S. Pat. No. 4,284,846 requires more software than was orignally expected for dealing with gaps of "silence" between phonemes in some ordinary speech. My subsequent research has also shown that more clues are necessary to reliably distinguish between certain closely related phonemes than is indicated in my U.S. Pat. No. 4,284,846. Furthermore, my subsequent research has shown that the considerable variation in the pitch of any typical person's normal speaking voice, and the affect upon the speech waveform of the configuration and position of the speaker's various "articulators", such as the size and shape of the mouth cavity, the size and shape of the nasal cavity, the size and shape and position of the tongue, the size and position of the teeth, and the size and position of the lips of the speaker cause, in some cases, inaccuracies in the "characteristic ratios" described in my U.S. Pat. No. 4,284,846. This makes it more difficult to achieve a comprehensive, completely inclusive, speaker-independent phoneme recognition system than I previously thought to be the case.

Accordingly, there still remains an unmet need for a less expensive, more accurate, more reliable, more speaker-independent, and more pitch-independent voice recognition than is possibly achievable by any device or system or method disclosed in the prior art, other than my own prior patents, presently known to me.

In the area of speaker-dependent voice command recognition systems there are a number of devices presently available. They are capable of receiving, for example, simple word commands and producing corresponding digital command codes which are transmitted to a computer. Typically, such voice command systems must be "trained" to recognize particular command words spoken by a particular speaker. It should be appreciated that an average person can not speak the same word in exactly the same way twice. In fact, there is a great variation in the speech waveforms produced when an average person tries to speak the same word a number of times. Present speaker-dependent voice command recognition systems are not capable of storing digitized speech waveform data for only one utterance of a particular command, and then later reliably recognizing the same word spoken by the same speaker. Therefore, the presently available systems are "trained" by instructing the speaker to speak the desired word into the system's microphone a number of times. The microphone signal for each repetition of the word is amplified and digitized, typically by using zero-crossing techniques, and sometime by using analog to digital converters and processing the resulting digital output. Some of the available systems compare each stored version of that word with the digitized version of a later spoken utterance of that command word to try to match the spoken command with one of the stored versions of it. Various auto-correlation operations are performed to determine if there is a match. Other systems use various techniques to average the digitized data of the numerous utterances of the same command word received during the "training" session, and then compare a later spoken command and with the stored averaged data in attempting to recognize the spoken command. Such prior systems are slow, expensive, and unreliable, and are not yet widely used.

SUMMARY OF THE INVENTION

Accordingly, it is an object of the invention to provide a means of accurately representing the phonemic information contained primarily in the positive pressure wavefronts of a speech waveform in simple x, y coordinate pairs to form a phoneme map.

It is another object of the invention to provide an accurate phoneme or characteristic sound recognizing system that uses a simple digitizing circuit for converting an analog speech waveform to a binary waveform in which the major inflection points of the speech waveform correspond to the transition edges of the binary waveform.

It is another object of the invention to provide a method and apparatus for extracting the major phonemic information or characteristic sound information from selected time windows representing the smallest duration portions of each sound waveform pitch cycle that contains such phonemic information or characteristic sound information.

It is another object of the invention to provide a phoneme recognition system or characteristic sound recognition system which operates in a fashion that corresponds to and is consistent with the internal workings of the human inner ear cochlear mechanics.

It is another object of the invention to provide an effective and simple way of dealing with silent intervals in speech so as to minimize circuit and/or digital processor activity in response to background "white noise" pulses contained in such silent intervals.

It is another object of the invention to provide an accurate, simple device for obtaining starting and ending times of phonemes, and for demarcating silent intervals between phonemes, and for storing such times or intervals.

It is another object of the invention to provide a means of compensating for modulating shifts produced in the characteristic relationships between time durations of certain major points of inflection of the speech waveform caused by inharmoneous differences between the frequency of the pitch cycle being produced by a speaker's vocal cords and the resonant frequencies of the articulating portion of the speaker's mouth.

It is another object of the invention to provide a means of producing and using signals representing fast-moving trajectories of two key parameters on a phoneme map to provide "clue signals" that distinguish between closely related short duration consonant phonemes.

It is another object of the invention to provide a method and apparatus for reducing the complexity of the analog waveform produced by a microphone receiving continuous, connected-word speech signals to allow circuitry of minimum complexity to produce a binary representation of the speech signals, which binary representation can be processed in real time by a single chip microcomputer to accurately, reliably, and independently of the speaker and pitch of his voice, produce phonemic identification code or symbols that can be displayed or printed or otherwise used in electromechanical or electronic apparatus which may benefit from man-to-machine spoken communication using accurately identified speech phonemic elements, to accurately represent human speech.

It is another object of the invention to provide an improved method and system for "compact" digital representation of speech and sound signals which digitally represent the most significant portions of a speech waveform.

It is another object of the invention to provide an improved, low cost, reliable, low complexity method and apparatus for accomplishing speaker-dependent voice comand recognition.

It is another object of the invention to provide an improved, low cost, reliable, low complexity device for accomplishing recognition of spoken utterances by comparison of features of the spoken utterances with utterance features previously stored by speaking the same utterances into the system.

Briefly described, and in accordance with one embodiment thereof, the invention provides a system and method for producing a binary signal having a "1" level during positive pressure wave portions of a sound signal and a "0" level during negative pressure wave portions of the sound signal, detecting the time point of the major peak positive and negative excursions of each pitch cycle of the sound signal and producing a corresponding pitch cycle marker signal that occurs substantially at the beginning of each pitch cycle, producing a first number that represents the duration of a "1" level of the binary signal most closely following a pulse of the pitch cycle signal and producing a second number that represents the duration of the following "1" level of the binary signal, composing a vector from the first and second numbers, comparing that vector with a plurality of stored vector domains to determine if the present vector falls within any of the stored vector domains, and producing a character signal or a phoneme identifying signal or code representing a phoneme or sound corresponding to a one of the stored vectors that most nearly matches the present input vector. In the described embodiment of the invention, the system also produces a first "running average" of the durations of the "1" levels and a second "running average" of the durations of the "0" levels for a plurality of the pitch cycles of the binary signals and also produces a summation of the durations of the "1" and "0" levels of each and every pitch cycle, divides that summation by the sum of the running averages of the "1" and "0" intervals, and, if there is a remainder, uses that remainder to obtain a correction factor that is added to or multiplied by the input vector formed from the successive "1" levels to compensate for inaccuracies in the input vector caused by the influence of mismatches between the pitch cycle of the sound presently uttered by a speaker and the resonant frequency of the present configuration of the mouth cavity of the speaker. In the described embodiment of the invention, the change or "velocity" of the durations of the "1" levels is computed on a real time basis, as is the rate of change, or "acceleration" of the "1" levels. On the basis of these accelerations and/or velocities, which represent the velocities and/or accelerations of various parts of the speaker's articulation apparatus, character demarcation signals or phoneme demarcation signals or codes that represent the begining or end of a character or phoneme represented by the present sound signal are produced.

Concurrently, fricative vectors are computed between the "1" and "0" running averages and are compared with a plurality of stored fricative vector domains to determine the best match of the stored fricative domains with the presently computed fricative vector. A fricative phoneme signal corresponding to a one of the stored fricative vector domains that best matches the presently computed fricative vector is produced if there is such a matching, indicating non-voiced fricative phonemes or fricative content in a voiced phoneme. Intervals of silence, indicated by quite small durations of sporadic "1" intervals, are assigned a "0" level. If the duration of a silent interval falls into a predetermined range that is compared to a table of stored durations, each of which corresponds to the onset of a different plosive phoneme, then the identified interval is used to help identify the plosive phoneme corresponding to the matched stored silence duration. All of the foregoing information is utilized to generate various phoneme code signals that can be used to drive a printer, display a sequence of phoneme characters that accurately represent the incoming speech or other characteristic sounds or provide various pre-arranged activities in a wide variety of machines or apparatus which can benefit from the guidance of speech and sound signals.

In another embodiment of the invention, an apparatus and method are disclosed for providing a compact digitizing of a speech or sound waveform, by producing the above first and second running averages of the durations of the "1" and "0" levels, respectively, sampling the first and second running averages at predetermined intervals, operating on the sampled data to identify and produce event data for significant events in the speech or sound waveform, including rapidly rising and rapidly falling values of the first running average, "silence" values of the second running average to produce a very compact digital representation of the meaning of the speech or sound waveform. In a described embodiment of the invention, this event data is arranged in "windows" of significant events of the speech waveform, and the event data in each window is compared to previously stored event data which previously has been similarly obtained by speaking selected words into the apparatus and producing and storing significant data, identifying matches of significant event data in the window to stored reference event data, and repeating the procedure for event data in another window that begins immediately after a matching is detected, until a predetermined number of consecutive failures to match an event in a particular window to that number of reference event or until all events of the utterance lows tested against reference events. More specifically, event data for each significant event of a first window is compared to reference event data for a first reference event, and any matching is identified, in accordance with weighting criteria, and a score representing the degree of mismatching is accumulated. Immediately after any matching is detected, a new window of subsequent significant events of the speech or sound waveform is compared to a subsequent reference event. A higher degree of recognition of voiced commands is achieved at a lower degree of complexity than has been previously achieved. In this embodiment of the invention, a microphone, amplifying and filter circuitry, inflection point detecting circuitry, and a microprocessor are included in a circuit to produce the sampled values of the first and second running averages. The operations on the sampled values of the first and second running averages are performed by a desk top computer coupled by a cable to the unit, and the instructions for conducting these operations are contained in a program loaded into the desk top computer.

BRIEF DESCRIPTION OF THE DRAWINGS

FIG. 1 is a block diagram of an embodiment of the invention.

FIG. 2 is a diagram showing a portion of a speech waveform and a binary waveform corresponding to major inflection points of the speech waveform.

FIG. 3 is a diagram of a decision tree in which input vectors computed in real time, silence intervals, and swoop trajectory directions computed in real time are compared to entries in a stored vector map or lookup table to identify the most recently uttered phoneme.

FIG. 4 is a circuit schematic diagram of the microphone signal amplifier of FIG. 1.

FIG. 5 is a circuit schematic diagram of the audio band pass amplifier of FIG. 1.

FIG. 6 is a circuit schematic diagram of the pitch band pass amplifier of FIG. 1.

FIG. 15 is a flow chart of a subroutine executed by the microcomputer 10 of FIG. 1 to service an interrupt request produced by the shaper and latch circuit of FIG. 1.

FIG. 20 is a graph of two waveforms that are useful in describing the operation of the device of FIG. 19.

FIG. 24 is a block diagram of an embodiment of the invention with a higher degree of circuit integration than the embodiment of FIG. 1.

DESCRIPTION OF THE INVENTION

Figure 7:
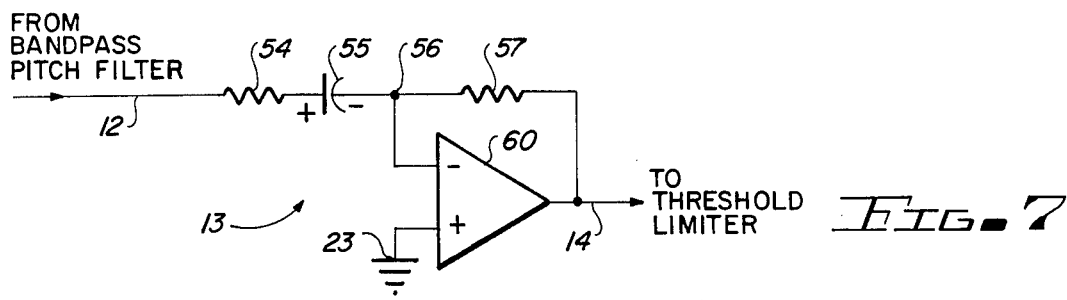
FIG. 7 is a circuit schematic diagram of the major peak detector circuit in FIG. 1.

Referring now to FIG. 1, a speech analyzer circuit 1 includes a microphone 2 which receives audible speech sounds and produces an electrical signal that is applied to the input of a microphone signal amplifier circuit 3. In accordanc with the present invention, speech analyzer circuit 1 produces electrical signals on bus 21 that identify speech phonemes and other audible sound-representing electrical signals. For example, the electrical signals produced on bus 21 can be ASCII signals or the like for causing phonemic symbols or other characters to be printed or displayed on a suitable screen. Or, the signals on conductor 21 can be utilized to control a variety of other kinds of electromechanical apparatus, such as desk-top computers, automobiles, robots and the like, in response to voice commands. The signals on conductor 21 can also be utilized to operate apparatus such as devices for aiding speech-impaired persons, to operate phonetic typewriters, and can find many other applications in the general field of speech-to-machinery communication.

Note that the electrical signals on bus 21 do not, however, represent speech that has been recognized in the semantic sense, nor do the signals on bus 21 represent the correct spelling used to represent sounds and words in various human languages. The electrical signals on bus 21 only represent characteristic sounds, such as phonemes which are generally generally used in all spoken languages.

The output produced by amplifier 3 is applied by conductor 4 to the input of an audio band pass filter amplifier 5, which has a center frequency of approximately 550 hertz and passes a band of frequencies adequate for phoneme recognition. The output of filter amplifier 5 is produced on conductor 7 and applied to the input of an inflection point detector circuit 8, which performs the function of generating a binary output signal on conductor 9. The positive and negative transitions of binary signal 9 occur at precisely the times of occurence of major inflections of the input signal on conductor 7. For purposes of this disclosure, a major inflection is one that ocurs when the positive-going or negative-going waveform on conductor 7 endures for at least approximately 50 microseconds before the next point of inflection arrives and the slope of the waveform reverses direction. The binary waveform on conductor 9 has the appearance of the signal 44C in FIG. 2, which is a duplicate of speech waveform 33 and binary signal 44C in FIG. 7 of my prior U.S. Pat. No. 4,284,846 entitled "SYSTEM AND METHOD FOR SOUND RECOGNITION", issued Aug. 18, 1981 and entirely incorporated herein by reference.

Inflection point detector circuit 8 has an adjustment circuit 22 which is connected to a ground conductor 23. Adjustment circuit 22 allows normalizing of the binary waveform on conductor 9 to a "standard" waveform. (As subsequently explained, the input circuitry used in inflection point detector circuit 8 has various input offset leakage currents which must be compensated for to produce a standard offset.)

The binary waveform on conductor 9 is a real time binary signal that is fed into a capture register 11 of a single chip microcomputer 10, which can be any of a variety of available devices, such as a Motorola MC68701.

The above described path from microphone 2 to capture register 11 of microcomputer 10 is one of the two input signal paths to microcomputer 10. The other signal path applies the amplified analog speech signal of conductor 4 to the input of a band pass "pitch" filter amplifier 6, the output of which is applied by conductor 12 to the input of a negative peak detector circuit 13. The band pass "pitch" filter amplifier 6 has a much lower pass band than the audio band pass filter amplifier 5, because the purpose of bandpass filter 6 is to encompass the "pitch" or vocal cord frequency of average human voices.

The output signal 14, which identifies the times of occurrence of major negative peaks of the band pass filter output signal on conductor 12, is applied to the input of a threshhold limiting circuit 15. Threshhold limiting circuit 15 allows the microcomputer 10 to provide a threshhold adjustment voltage on conductor 16 to raise or lower the sensitivity of threshhold limiting circuit 15, so that only the negative peaks on conductor 14 having the greatest amplitude are passed onto conductor 17. These maximum amplitude signals on conductor 17 are referred to as "pitch trigger" signals or pulses. The "pitch trigger" signals such as 24 are applied by conductor 17 to an input of a pulse shaper and latch circuit 18.

The purpose of circuit 18 is to greatly shorten the time of the leading edge of the trigger pulses to operate the binary latch. When the latch circuit in block 18 is set, it produces a negative edge, such as the one indicated by reference numeral 25. This negative edge 25 is interpreted as an interrupt by interrupt circuitry 27 inside microcomputer 10. After the microcomputer has interpreted and serviced the interrupt request signal on conductor 19, microcomputer 10 produces a "clear" signal 26 on conductor 20 to clear the latch circuitry in block 18.

Note that the interrupt signal on conductor 19 must remain at a low level until the microcomputer 10 has had an opportunity to interpret and act in response to the interrupt. Note also that the procedure for producing the clear signal on conductor 20 and applying it to the latch in block 18 provides a means by which microcomputer 10 can "refuse" to "look at" pitch trigger signals on conductor 17. Thus, this circuitry provides a means of increasing or lessening, under microcomputer control, the select number of pitch trigger signals that might be considered in the phoneme analyzing process of the invention. Otherwise, there would be frequent instances of multiple pitch triggers on strong or stressed sounds.

The selected pitch trigger signal serves as a pointer to locate the first negative pressure wave related to the onset of each glottal pulse of the speaker, in order to allow locating and measuring the durations of the following first two positive pressure waves, which, in accordance with my recent discoveries, contain a major portion of the information that allows accurate determination of the identity of the phoneme or characteristic speech sound presently being input to microphone 2.

The input capture register 11 of microcomputer 10 operates in conjunction with a software subroutine that detects the occurrence of any negative-going or positive-going transition of the binary waveform on conductor 9 and stores the time of that occurrence in a 16 bit software capture register. This provides accuracy of "capture" of each transition of the binary speech waveform 9 to within one microsecond. The disclosed arrangement allows microcomputer 10 to capture, in real time and with very high accuracy, each major inflection point (as defined above) of analog speech waveforms on conductor 7. The binary waveform on conductor 9 is, in effect, a "piece-wise linear" approximation of the analog signal on conductor 7.

In accordance with the teachings of my prior U.S. Pat. No. 4,284,846, the characteristic ratios or vectors between such major inflection points can be compared to stored phonemic vectors by means of the decision tree shown in FIG. 3 (which is nearly identical to FIG. 8 in my above mentioned U.S. Pat. No. 4,284,846) to rapidly identify, in real time, the phoneme presently being uttered by a speaker into microphone 2 or the characteristic sound presently being received by microphone 2.

Figure 17:
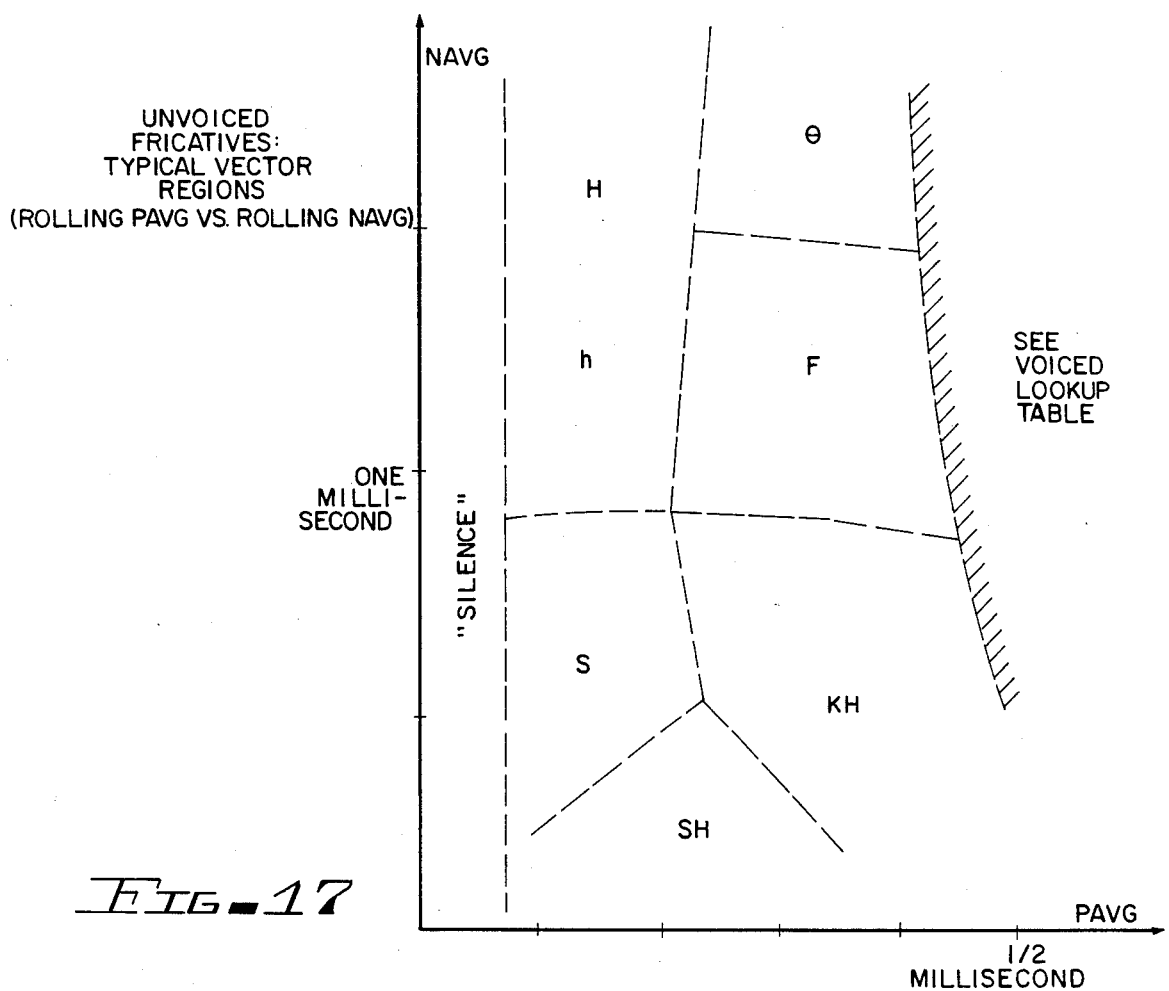
FIG. 17 is a generalized fricative vector domain map useful for identifying an unknown fricative phoneme.
Figure 18:
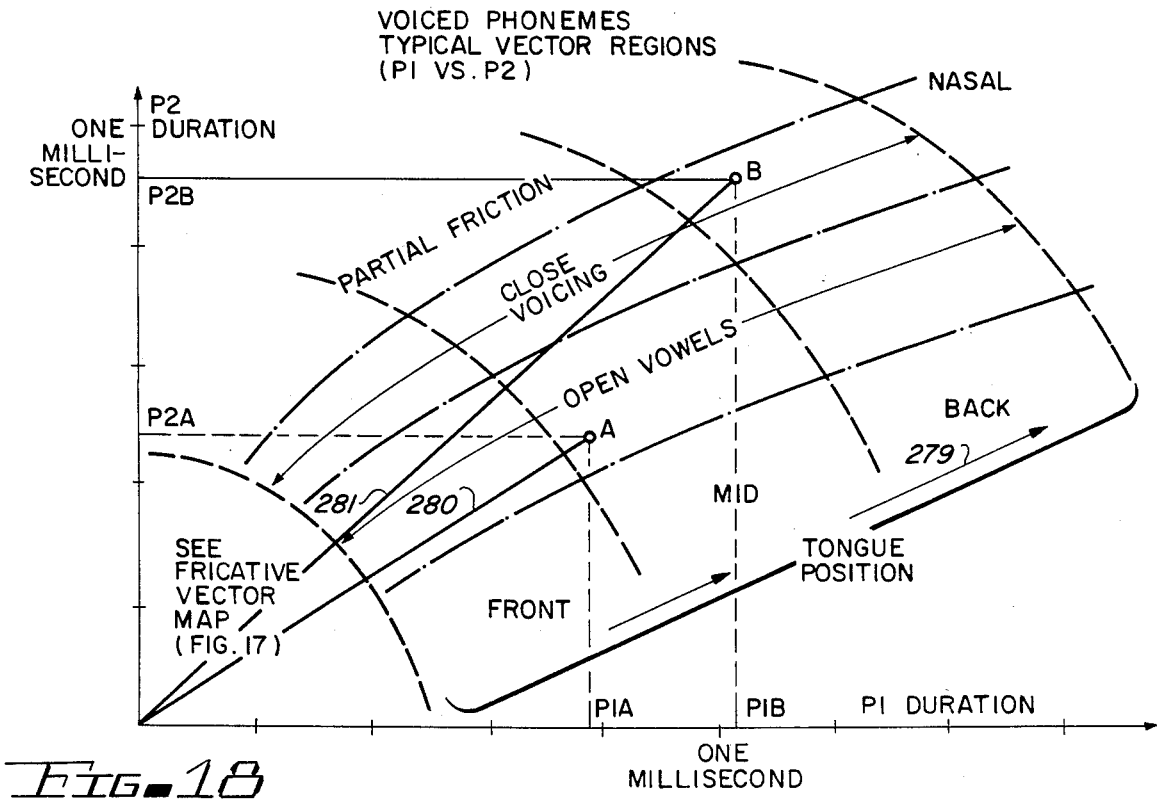
FIG. 18 is a generalized voiced phoneme vector domain map useful in identifying an unknown voiced phoneme.

In accordance with my more recent discoveries, a "vector map" representation of the first two positive pressure wave time durations, such as the vector maps shown in FIGS. 17 and 18, provides a more accurate decision tree than can be achieved using calculated ratios, which are scalar quantities, compared to vectored quanties which include scalar amplitudes and directions.

Referring next to FIG. 4, a detailed circuit schematic diagram of a well known microphone amplifier circuit 3 is shown. It includes an inexpensive electrect microphone cell 2 coupled to ground conductor 23 and also coupled by a bias resistor 31 to a five volt supply conductor 32. The output of microphone cell 2, which is the same as microphone 2 in FIG. 1, is connected to one terminal of a 4.7 microfarad capacitor 34, the other terminal of which is connected by means of a 2.2 kilohm resistor 35 to the negative input of an operational amplifier 37, which can be a National Semiconductor LM324. The positive input of operational amplifier 37 is connected to conductor 39, to which a bias voltage of approximately two volts is applied. Conductor 36 is connected to the negative input of operational amplifier 37, and is coupled by a 100 kilohm feedback resistor 38 to the output of operational amplifier 37, which is also connected to conductor 4, also shown in FIG. 1.

The electrect microphone 2 has a flat pass band from under 100 hertz up to over 15 kilohertz. Capacitor 34 provides audio frequency coupling that blocks off the bias voltage from the input of operational amplifier 37. The gain of this amplifier circuitry is, of course, determined by the ratio of the resistance of resistor 38 to the resistance of resistor 35. However, care has to be taken to ensure that even slight coupling from the digital signal lines associated with microcomputer 10 onto conductors 36 and 39 as a result of the physical layout configuration of microphone amplifier circuit 3 is avoided.

Referring now to FIG. 5, a well known audio band pass amplifier circuit 5 has its input connected to conductor 4. Conductor 4 is coupled by 18 kilohm resistor 41 to conductor 43. Conductor 43 is coupled by 5.6 kilohm resistor 45 to ground, and is also coupled by 0.01 microfarad capacitor 42 to conductor 48, and by 0.01 microfarad capacitor 44 to conductor 47. A 240 kilohm feedback resistor 46 is coupled between conductors 47 and 48. Conductor 48 is connected to the negative input of operational amplifier 50, which can be a National LM324 operational amplifier. Its output is connected to conductor 47 and its positive input is connected to conductor 49, to which a bias voltage of approximately two volts is applied.

The purpose of this circuit is to eliminate very high frequency, rapidly fluctuating signals that could create pulses that are so fast, and are of such short duration (below approximately 50 microseconds) that microcomputer 10 cannot reliably interpret them. On the other hand, as will be discussed, the circuit of FIG. 5 must pass an adequate number of pulses representing fricative phonemes.

An adequate range of frequencies for fricatives and voiced sounds has a center frequency of approximately 560 hertz and a pass band going from about 200 hertz to approximately 2300 hertz. The above indicated component values produce this pass band and provide a gain of approximately 10.

Fricative sounds typically have frequencies of approximately 4,000 hertz to 6,000 hertz. Some fricative high frequency components do get through the simple band pass filter 5, which high frequency components are necessary to provide all of the "clues" needed to adequately distinguish various fricative sounds.

The audio band pass amplifier 5, with the above-indicated components values, provides an output range of signal amplitudes from approximately 60 millivolts peak-to-peak to approximately 3.3 volts peak-to-peak as inputs to the major inflection point detector circuit 8. In response to this input, inflection point detector circuit 8 produces a constant amplitude digital signal which can represent the wide "dynamic range" of spoken sounds.

This conversion of analog speech signals of widely varying amplitudes to a constant amplitude binary signal overcomes one of the severe shortcomings of many of the prior voice recognition approaches reported in the literature, namely the problem of dealing with signals having a very wide range of amplitudes with an adequate level of accuracy.

In contrast, my circuitry is very insensitive to wide variations of the amplitude of the analog speech signals, contrary to the majority of the teachings in the literature and prior art pertaining to speech recognition to the effect that the primary technique for demarcation between phonetic elements is by sensing or observing the amplitude envelope of the speech waveform.

In further contrast, I have found that by using the time duration of the positive and negative slopes of the speech waveform, the rate of change or acceleration of these durations can be analyzed to provide better demarcation between phonemic elements of speech, and presumably other highly characteristic features of other sound waveforms. In addition, I have found that changes in the pitch due to stress accenting of speech also aids in the demarcation of connected phonetic elements.

The above described approach allows producing of digital signals that are easily handled and analyzed by microcomputer 10, thereby avoiding the difficulties in accurate analysis of analog signals having rapidly varying amplitudes.

Perhaps it will be best to describe the pitch band pass amplifier circuit 6 in some detail before discussing the inflection point detection circuit 8.

Referring next to FIG. 6, the pitch band pass amplifier circuit 6 has its input connected to conductor 4, which is coupled by 7.5 kilohm resistor 142 to conductor 143. Conductor 143 is coupled by 15 kilohm resistor 52 to ground conductor 23, by 0.047 microfarad capacitor 145 to conductor 146, and by 0.047 microfarad capacitor 149 to conductor 12. Conductor 146 is coupled to the negative input of an operational amplifier circuit 147, which can be a National Semiconductor LM324 operational amplifier, and by 68 kilohm feedback resistor 53 to conductor 12, which is also connected to the output of operational amplifier 147. The positive input of operational amplifier 147 is connected to conductor 148, to which a bias voltage of approximately two volts is applied. This circuit, with the above-indicated component values, has a center frequency of approximately 190 hertz, and has a pass band of approximately 100 hertz to approximately 360 hertz, and has a gain of approximately four. This circuit is a multiple feedback band pass filter which is well known. Its pass band covers the normal frequency range or pitch range of the glottal pulses uttered by most humans. The gain of filter amplifier 6 is only four because it is desired to detect only relatively large amplitude negative pressure wave peaks in the analog voice waveform produced by amplifier 13. This "pitch band pass amplifier" 6 is designed to very selective, so as to cancel out the higher frequency components and sharp background noise as much as possible, and to provide amplification only in the band in which human glottal pulses occur normally.

Referring next to FIG. 7, the major peak detector circuit 13 detects major negative peaks in the complex audio waveform that is produced on conductor 4 by amplifier 3, and then is filtered by pitch filter 6 to produce the signal on conductor 12. Peak detector circuit 13 has its input connected to conductor 12, which is coupled by a 2 kilohm resistor 54 to one terminal of 0.01 microfarad capacitor 55, the other terminal of which is connected to conductor 56. Conductor 56 is connected to the negative input of operational amplifier 60, which can be a National Semiconductor LM324, and is also coupled by 240 kilohm resistor 57 to conductor 14. Conductor 14 is connected to the output of operational amplifier 60. The positive input of operational amplifier 60 is connected to ground conductor 23.

Figure 8:
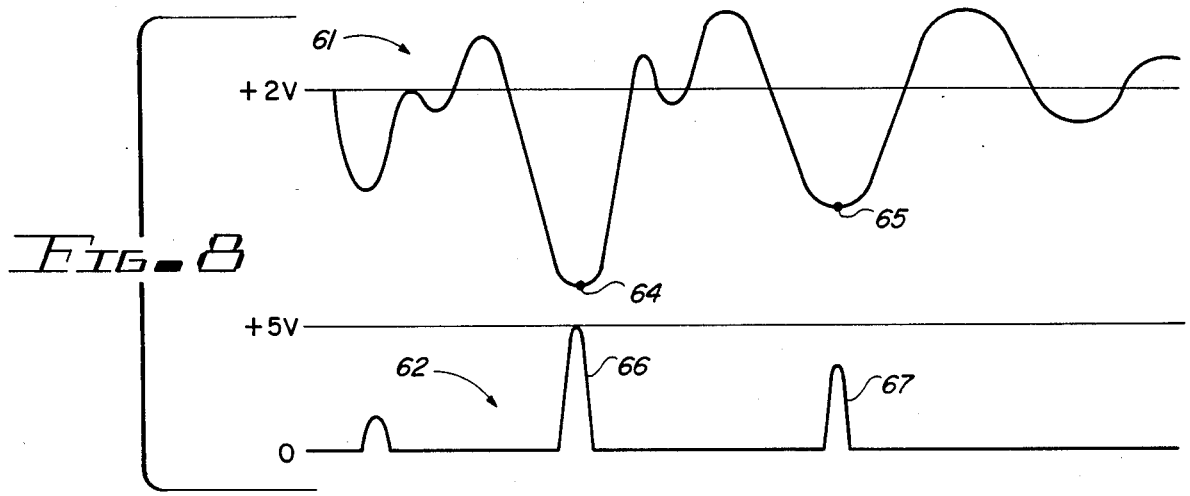
FIG. 8 is a diagram showing several cycles of a speech waveform, and is useful in describing the operation of the circuit of FIG. 7.

The operation of peak detecting circuit 13 can be best understood with reference to the waveforms of FIG. 8. In FIG. 8, waveform 61 designates a signal resulting from glottal vibrations of the vocal cords that result in producing of the signal on conductor 12, which we may call the analog pitch signal. Waveform 62 is the output of peak detecting circuit 13 on conductor 14. The above circuit detects the most negative excursion of the analog pitch signal 61, namely negative excursion 64. The input signal 61 rides on a two volt DC bias voltage.

As described elsewhere herein, each glottal pulse intiates a reverberatory sequence of negative and positive peaks whose positions and excursions depend on the cavity resonances of the speaker's articulation apparatus at the present moment. These excursions decay as the sound energy is dissipated, until another glottal pulse occurs to re-energize the speaker's resonant cavities. Circuit 13 has a shortcoming in that it will detect moderate amplitude negative excursions in addition to larger negative excursions of the waveform 61. This results in output pulses on conductor 14 corresponding to waveform 62 in FIG. 8.

More specifically, peak detector circuit 13 produces pulse 66 in response to the negative excursion indicated by reference numeral 64 and produces pulse 67 in response to the negative excursion 65 of input signal 61. My above-described circuitry can detect only the maximum amplitude negative excursion of each pitch cycle for a four to one range of pitches.

Depending on how close the pitch cycle is harmonically related to the present resonant frequency of the voice cavities of the speaker, the second negative excursion, such as 65 in FIG. 8, can be almost as great in amplitude as the first negative excursion 64. Accordingly, it was necessary to produce the threshhold limiting circuit 15, and provide computer-controlled adjustment of the threshhold of circuit 15.

It should be borne in mind that a reason for detecting the most negative excursion of each pitch cycle of the speech waveform is to reliably identify the location of the first positive pressure wave producing the speech waveform, since I have found out that the start of that pressure wave and the termination of the following positive pressure wave delineates a pitch synchronized "window" which contains enough information to allow accurate identifcation of the phoneme represented by the present portion of the speech waveform, provided, however, that circuit corrections are made for "discrepancies" between the present pitch of the speaker's voice and the resonant frequency of the present configuration of the speaker's mouth, i e., articulation apparatus. The information outside of this pitch synchronized window is quite speaker-dependent and pitch-frequency dependent, and therefore is not used to identify phonemes.

Many previous researchers have performed the filtering of the speech waveform with large memory, high speed, very costly computers using Fourier transforms. Many researcbers have attempted to locate the peak pulses by looking at the digital numbers produced by analog to digital converters receiving an analog speech waveform. Others have attempted a purely analog approach to pitch detection. The use of dedicated analog circuits to detect the major pitch pulses in cooperation with a microcomputer algorithm as described here appears to be quite cost effective.

Figure 9:
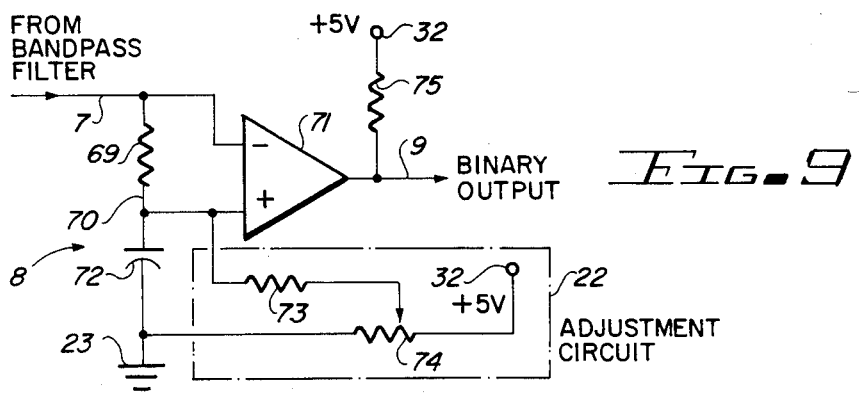
FIG. 9 is a circuit schematic diagram of the inflection point detector circuit of FIG. 1.

Next, the slope detector of major inflection point detector circuit of FIG. 1 is shown in detail. This circuit is shown in FIG. 9, wherein the filtered audio signal on conductor 7 is applied to the negative input of a high sensitivity comparator 71, which can be a Motorola MC3302 comparator. Conductor 7 is also coupled by 3.3 kilohm resistor 69 to conductor 70, which is connected to the positive input of comparator 71, and is also connected to the terminal of a capacitor 72. The other terminal of capacitor 72 is connected to ground conductor 23. Conductor 70 is also coupled by 220 kilohm resistor 73 to the tap of a potentiometer 74, which is connected between +5 volt conductor 32 and ground.

Figure 10A:
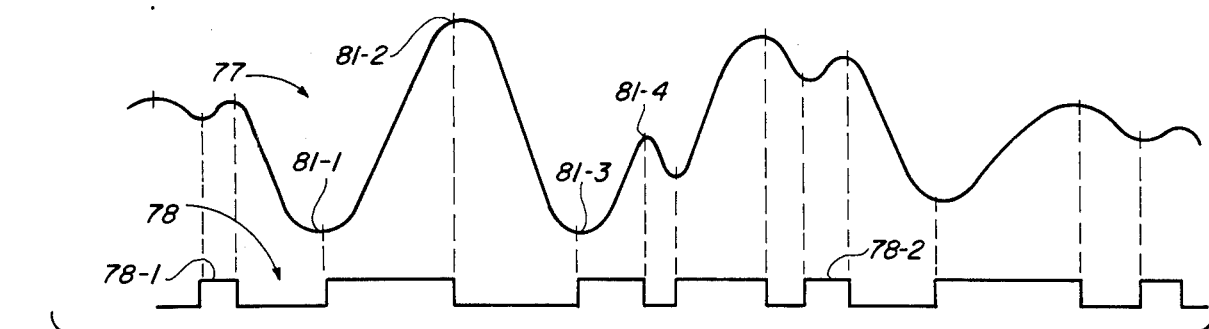
FIG. 10A is a diagram including two waveforms useful in describing the operation of the inflection point detector circuit of FIG. 9.
Figure 10B:
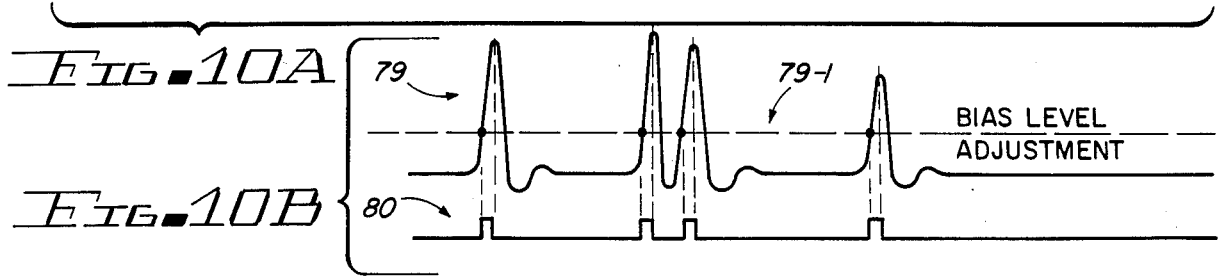
FIG. 10B is a diagram showing two waveforms that are also useful in describing the operation of the circuit of FIG. 9.

The output of comparator 71 is connected to conductor 9 and is also coupled by 22 kilohm pull-up resistor 75 to the +5 volt conductor 32. The binary output signal 44C shown in FIG. 2 is produced on conductor 9. (Other examples of the binary output signal on conductor 9 are shown in FIGS. 10A and 10B, subsequently described.

A very important aspect of the improvement of the present invention is the providing of a band-limited waveform such as the one produced on conductor 7, and, by means of a very simple circuit such as 8, producing a "piece-wise linear" binary representation of this band-limited waveform which is invariant with respect to the amplitude of the audio signal and contains enough information to make phoneme recognition, especially speaker-independent phoneme recognition, possible.

Note that the strong pitch signal produced in response to the glottal pulses of the speaker has been attenuated on the low end of the frequency range, and a great deal of the very high frequency signals such as high frequency fricatives and background noise of the type commonly produced by fans and air conditioners, has been eliminated from the waveform on conductor 7. The filtered waveform on conductor 7 then has a bare minimum of features which nevertheless have enough information to accurately identify phonemes and other characteristic sounds represented by the speech waveform produced by the microphone 2.

A major challenge in providing the improvements of the present invention was to determine how much detail could be eliminated from the analog speech waveform while leaving enough detail that a relatively simple circuit could extract that detail and make it available in binary form for processing by a microcomputer, especially a single chip microcomputer, in such a way as to accurately detect, independently of the unique characteristics of a particular speaker, phonemes and characteristic sounds that make up speech and produce reliable identifying signals that allow the speech to be accurately represented by phonemic signals.

Most of the slope detector circuits reported in the prior art count "zero crossings" per unit of time in the speech waveforms. This, of course, causes important features in a speech waveform that do not cross the zero or average level of a speech waveform, to be lost. My results indicate that such lost features include some of the most important clues that are needed to detect and identify certain phonemic characteristics.

The circuit shown in FIG. 9, with no series resistor between conductor 7 and sampling resistor 69 results in maximum sensitivity and maximum dynamic range. Resistor 69, and capacitor 72 must have a time constant that will allow rapid response for the highest frequency that needs to be "observed" by the speech or sound analyzer circuit 1. During the time that the audio signal on conductor 7 goes in a positive direction, the current flowing through resistor 69 into capacitor 72 charges it in one direction, and causes a binary "1" to be produced at the output of comparator 71. When the next inflection point, such as 81-1, 81-2, 81-3, 81-4, etc. in waveform 77 in FIG. 10A occurs, there will be a reversal in the current flow direction, causing a change from a logical "1" to a logical "0", or vice versa, on conductor 9. Binary waveform 78 in FIG. 10A is the response of inflection point detector circuit 8 to the filtered analog speech waveform 77, and the narrow pulses 77-1, 77-2 of binary waveform 78 can readily be seen to occur at the times of the above-indicated inflection points caused by high frequency components contained in waveform 77.

In the publication "The Bionic Ear", Chapter 10, paragraph 10.7, by Stewart, there is shown a waveform quite similar to that shown in FIG. 10A of this application. The Stewart reference shows a procedure for converting speech to a highly "clipped" digital form. The textual description refers to it as "clipped" speech.

In the above Stewart reference, the objective is to find a way of simplifying speech for improved trams-mission in digital form over electrical lines, in essentially the same way that conventional delta modulator circuits attempt to improve digital transmission of speech over long lines and then reconstruct the original analog speech signal from the received digital signal. However, the Stewart reference does not suggest that the binary output produced by this circuit has the necessary information and accuracy to allow recognition of phonemes.

After many months of effort trying to simplify the "delta modulator" approach of my earlier U.S. Pat. No. 4,284,846 while still providing a binary output containing enough information to accurately detect phonemes, I independently arrived at a circuit quite similar to that disclosed in the Stewart reference, namely a circuit similar to that in FIG. 9 of the present application. One of major problems of the delta modulator circuitry of my prior patent was that it produces a binary output during periods of silence. The "silence" portion of the binary waveform output by the delta modulator circuit is very difficult to deal with, given the objective of reducing the software burden on a single chip microcomputer.

After much experimentation and research, I eventually arrived at the conclusion that negative slopes, which I found to correspond to negative pressure waves of speech, contain far less useful phoneme-identifying information that the positive slopes, which correspond to positive pressure waves of speech.

I concluded that it would therefore be economical to cause the negative shapes to be represented by the same binary level, i.e, a "0", as the binary level used to represent periods of "silence", which also contain little or no phoneme-identifying information. If the bias level produced on conductor 70 in the circuit of FIG. 9 by the silence adjustment circuitry, including resistor 73 and potentiometer 74, is set properly at the level indicated by reference numeral 79-1, this objective can be achieved so that the inflection point detector circuit will produce the desired constant "0" level in response to silence or "white noise" consisting of very short "1" level pulses, as indicated by waveform 80, and also in response to very low-level fricative pulses in the "silence" waveform 79 of FIG. 10B. These fricative pulses include sharp, narrow peaks with long durations of silence between them.

The periods of "silence" between the fricative pulses showm in waveform 79 result in "0" levels in the binary output waveform produced on conductor 9 by inflection point detector circuit 8 of FIG. 9. The procedure for adjusting the desired "offset" is to apply a 200 millivolt 1 kilohertz sine wave input to conductor 7, and adjust potentiometer 74 so that a binary output is produced on conductor 9. The resulting offset voltage on the positive input of comparator 71 compensates for input offset variations that will occur from unit to unit with the Motorola MC3302 circuit used to implement comparator 71.

Figure 11:
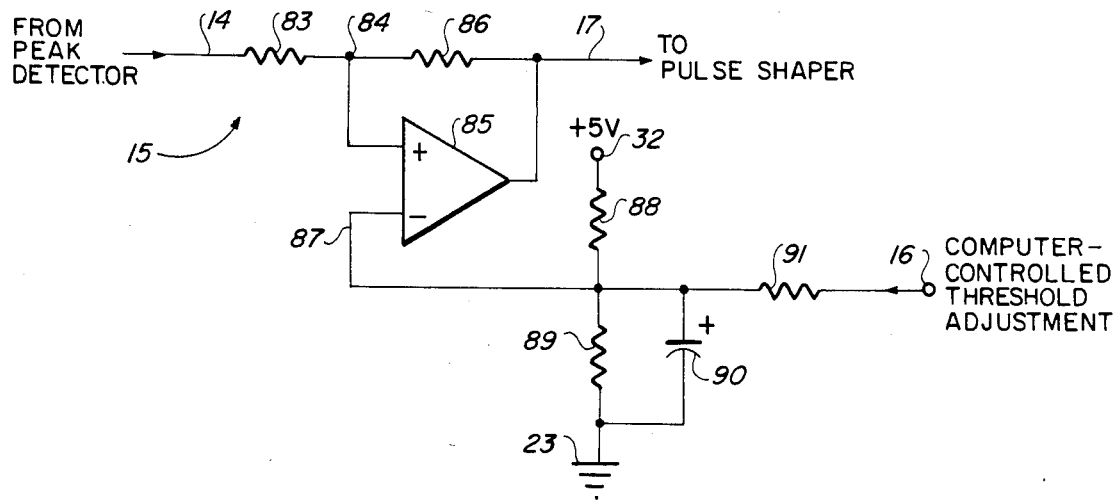
FIG. 11 is a circuit schematic diagram of the threshhold limiting circuit of FIG. 1.
Figure 12:
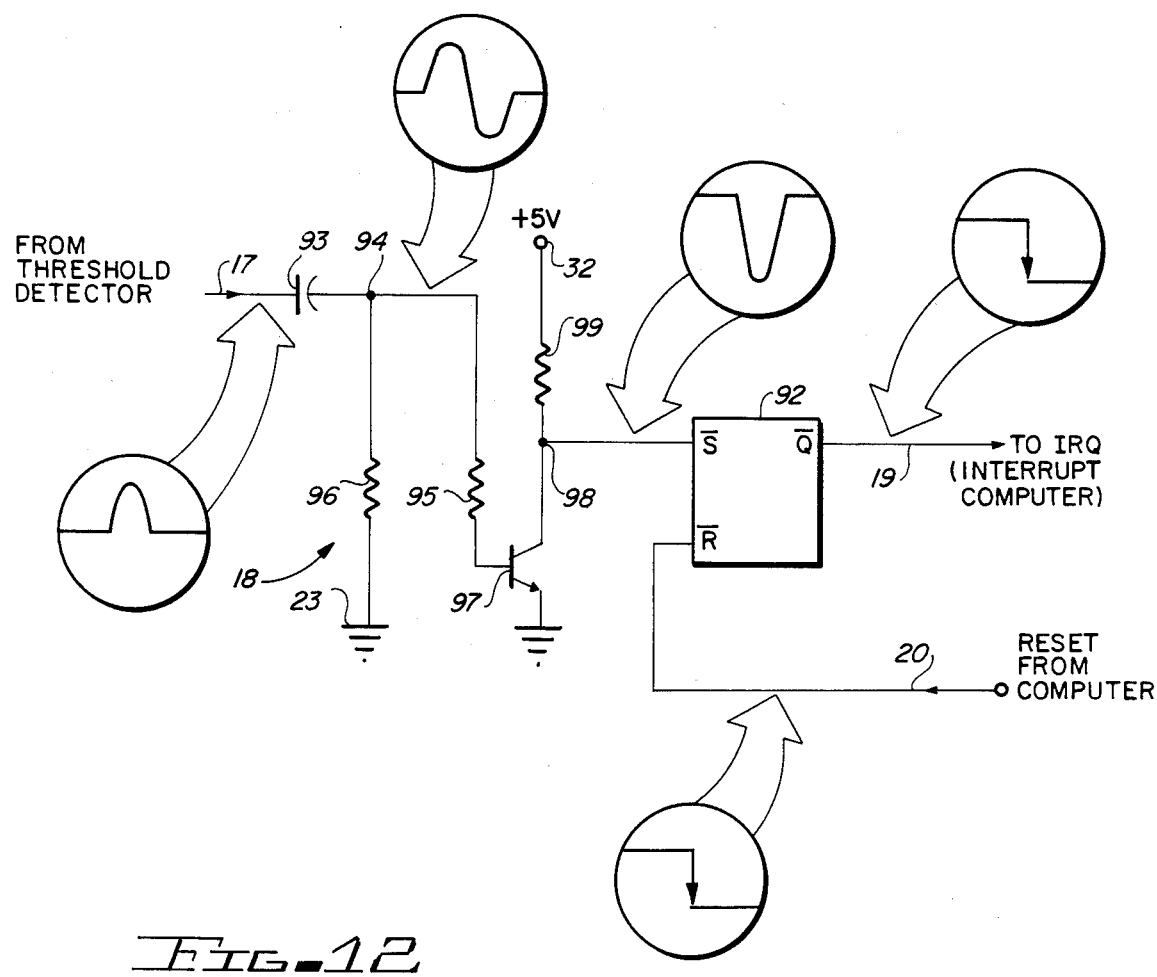
FIG. 12 is a circuit schematic diagram of the pulse shaper and latch circuit of FIG. 1.

Referring next to FIG. 11, the threshhold limiting circuit of FIG. 1 is shown. This circuit receives the peak pulses 62 (FIG. 8) on conductor 14 produced by peak detector circuit 13, and couples them by a 110 kilohm resistor 83 to conductor 84. Conductor 84 is connected to the positive input of operational amplifier 85, which can be a National Semiconductor LM324. Conductor 84 is also coupled by 510 kilohm resistor 86 to conductor 17, which produces a pitch period signal to pulse shaper and latch circuitry 18 of FIG. 12. Conductor 17 is also connected to the output of operational amplifier 85. The negative input of operational amplifier 85 is connected to conductor 87, on which a threshhold reference voltage having a "default" value of approximately 1.8 volts is produced by the resistive division of a +5 volt supply voltage on conductor 32 by resistors 88 and 89, which are connected in series between conductor 32 and ground conductor 23.

Conductor 87 is coupled by resistor 91 to threshhold adjusting conductor 16, which is connected to a suitable output port of microcomputer 10 to provide computer controlled adjustment of the threshhold of circuit 15. A capacitor 90 is also connected between conductor 87 and ground conductor 23 to provide a time constant of approximately 15 milliseconds with resistors 88, 89 and 91.

As mentioned above, the pitch trigger signal produced on conductor 14 by peak detector circuit 13 has amplitudes that vary considerably. Threshhold limiting circuit 15 performs the function of selecting only the highest amplitude pulses of these peak signals in each period. In threshhold limiting circuit 15, the ratio of resistors 88 and 89 establishes a reference level on the negative input of operational amplifier 85. This reference level is approximately 1.8 volts. Any voltage on conductor 14 that exceeds this 1.8 volts threshhold level will cause a positive pulse to be produced on conductor 17.

For a normal amplitude voice uttered from several feet away from the microphone, the 1.8 volts reference level produces a single pitch pulse per pitch period of the speaker's voice on conductor 17, for most voiced sounds. However, if a speaker has an exceptionally weak voice, or lowers the volume at the end of a word or is standing far enough away from the microphone, then few or no pulses will be produced on conductor 17 if the reference voltage remains equal to 1.8 volts. In this event, the microcomptuer 10 produces a sequence of "0" level pulses on conductor 16, which effectively reduce the charge on capacitor 19 temporarily, and thus lower the threshhold level at the negative input of the operational amplifier in order to pass the peak of the smaller pulses on conductor 14.

Conversely, strongly voiced phonemes having several pulses per pitch cycle, or the speaker speaking too close to the microphone, result in generation of too many pitch pulses. In this event, microcomputer 10 produces a sequence of "1" level pulses on conductor 16 to increase the charge on capacitor 90 temporarily, in order to reduce the number of pulses passed on conductor 17.

The microcomputer 10 may determine that if there are too many positive pulses being produced on conductor 17, the sound being received is not a "voiced" sound because no human vocal cords are capable of producing positive pressure waves with such rapidity. Other criteria involved in the subsequently described "autocorrelation" analysis also can be used by the microcomputer program to appropriately adjust the threshhold voltage adjustment signal on conductor 87.

In order to cause the pitch pulses produced on conductor 17 to have the proper characteristics for processing by conventional digital logic circuitry, it is necessary to "shape" them. This is done by the pulse shaper and latch circuit 18 shown in FIG. 12. This circuit receives the selected pitch trigger signals on conductor 17 and couples them by means of 780 picofarad capacitor 93 to conductor 94. Conductor 94 is coupled by 24 kilohm resistor 96 to ground conductor 23 and by 3.6 kilohm resistor 95 to the base of NPN transistor 97. The emitter of NPN transistor 97 is connected to ground conductor 23 and its collector is connected to conductor 98. Conductor 98 is coupled by 10 kilohm resistor 99 to 5 volt conductor 32. Conductor 98 is coupled to the S* (set) input of an RS latch 92, the R* (reset) input of which is connected to conductor 20. As previously explained, conductor 20 is connected to an output port of microcomputer 10. The Q* output of latch 92 is connected to the IRQ (interrupt request) conductor of microcomputer 10.

The relatively wide pitch trigger pulse on conductor 17 may be as much as 300 microseconds wide. Relatively small capacitor 93 and relatively large resistor 96 differentiate the pitch trigger signal, thereby producing a much narrower pulse on conductor 94. By applying this narrow pulse to the base of NPN transistor 97, which functions as an inverter, a narrow (approximately 10 microseconds) pulse is applied to the S* input of latch 92. When the latch 92 is set, the Q* output goes to a low level, causing an interrupt request flag to be set inside microcomputer 10. After responding to and evaluating the interrupt request, microcomputer 10 can then reset latch 92 by means of conductor 20, often blanking out some of the spurious strong pulses, since the pitch duration has been established.

Microcomputer 10 of FIG. 1 can be implemented by a Motorola MC68701 microcomputer with 2048 bytes of programmable program memory and read only memory. Average instruction execution times of 2 to 4 microseconds are required. The microcomputer must have 16 bit arithmetic capability, and 128 bytes of scratch pad memory. The microcomputer must also be capable of measuring elapsed times between two input events as close together as 100 microseconds and with a resolution of 2 microseconds and must be capable of forming internal and external timed alarms of equivalent resolution.

The microcomputer must be capable of providing parallel output data or serial codes representing identified sounds, phonemes, and allophones to various devices, such as desk-top computers which receive the signals as command words, or to a phonetic typewriter, or to tactile matrix devices to stimulate the skin of deaf persons, or to a low bit communications modem, or to a "hands off" instrument control panel, etc. Other suitable microcomputers that could be used include the Hitachi HD6301, the Intel 8096, or the Motorola MC68HC11.

The software executed by microcomputer 10 includes a "foreground" analysis routine which gathers information and stores it in its internal random access memory. This software also includes a "background" analysis program that includes an algorithm which processes the gathered binary data produced by the "foreground" routine and determines how it should be processed and when to take appropriate action. The heart of the background program executed by microcomputer 10 is shown in the flow chart of FIGS. 13A and 13B. The data that is stored in appropriate locations of the random access memory includes binary data representing the real times of the transitions between levels produced on conductor 9 in FIG. 1. These "captured" transition times are used to compute time intervals in accordance with the foreground flow chart of FIG. 14.

A "Glossary of Terms" is shown in Table 1, listing explanations of key terms used in the flow charts appended hereto.

TABLE 1

| | GLOSSARY OF TERMS |
|---|---|
| PVAL | The (time) duration of any positive-going slope in the audio waveform between peak points of inflection. |
| NVAL | The duration of any negative-going slope in the audio waveform between points of inflection, including any longer periods of zero slope as found in very weak fricatives or silent intervals. |
| PAVG or P* | A rolling average of successive PVAL time intervals using a number of stages of software filtering in order to indicate the trend of the P value. |
| NAVG or N* | A rolling average of successive NVAL values using a number of stages of software filtering in order to indicate the trend of the N value. |
| Q | The sum of any successive pair of PVAL and the following NVAL times which determines the total period of this resonant cycle. |
| QAVG | The sum of NAVG and PAVG. |

TABLE 1-continued
GLOSSARY OF TERMS

| | |
|---|---|
| SILENCE | Any N greater than some constant of time, i.e., 5 milliseconds. |
| VALID P | The first P greater than some constant of time, i.e., 200 microseconds, which follows a SILENCE interval. |
| FRICATIVE | A region of the audio waveform characterized by short P durations, i.e., under 400 microseconds for PAVG, interdispersed with various random times of N. |
| VOICED | A region of the audio waveform characterized by various durations of orderly, Ps of moderate length, i.e., over 450 microseconds, interdispersed with various durations of orderly Ns of similar durations. These orderly sequences repeat in a cyclic fashion every 1, 2, 3, 4, . . . sets of Q. |
| DELTA P, DELTA N | The time differences between the P and N durations stored in sections of the rolling average software filters, respectively. |
| SWOOP | DELTA P and/or DELTA N have exceeded prescribed values indicating that the speaker's articulating apparatus is moving to another position. |
| TRAJECTORY | The direction of motion in a swoop calculated by using the magnitude and sign of both DELTA values. |
| PITCH CYCLE | The time required for a cycle pattern of Q values to repeat. |
| PITCH PULSE | A pointer indicating the region in each PITCH CYCLE where a new burst of energy from the vocal cords has arrived to initiate the next cycle of cavity resonances. |
| P1, N1, P2 | The three significant segments following the PITCH PULSE. These pressure wave segments are least influenced by the "personality" of the speaker's overall resonant cavity details. |
| PITCH TIMEOUT | The predicated point in time where the next trigger should be. It is used to control the pitch trigger threshhold activity and to re-access the classification of the sound (silence, fricative, mixed, voiced) and the detailed identity of the phoneme. |
| DWELL | A long period of time where DELTA PAVG is below a prescribed rate of change, indicating that the speaker is attempting to sustain a particular phoneme. |

Figure 13A:
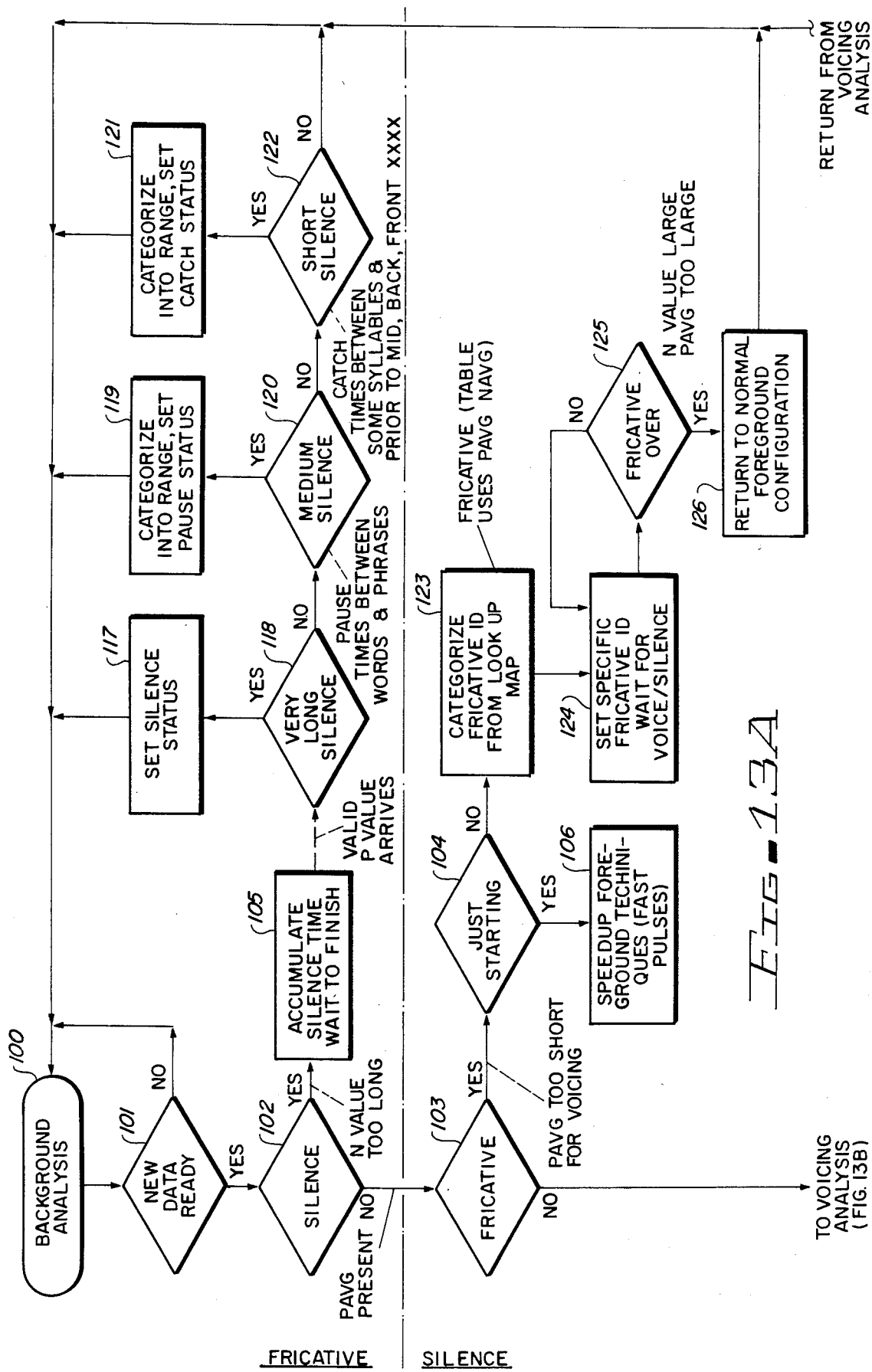
FIGS. 13A and 13B constitute a flow chart of a program executed by microcomputer 10 of FIG. 1 in accordance with the phoneme recognition method of the present invention.
Figure 13B:
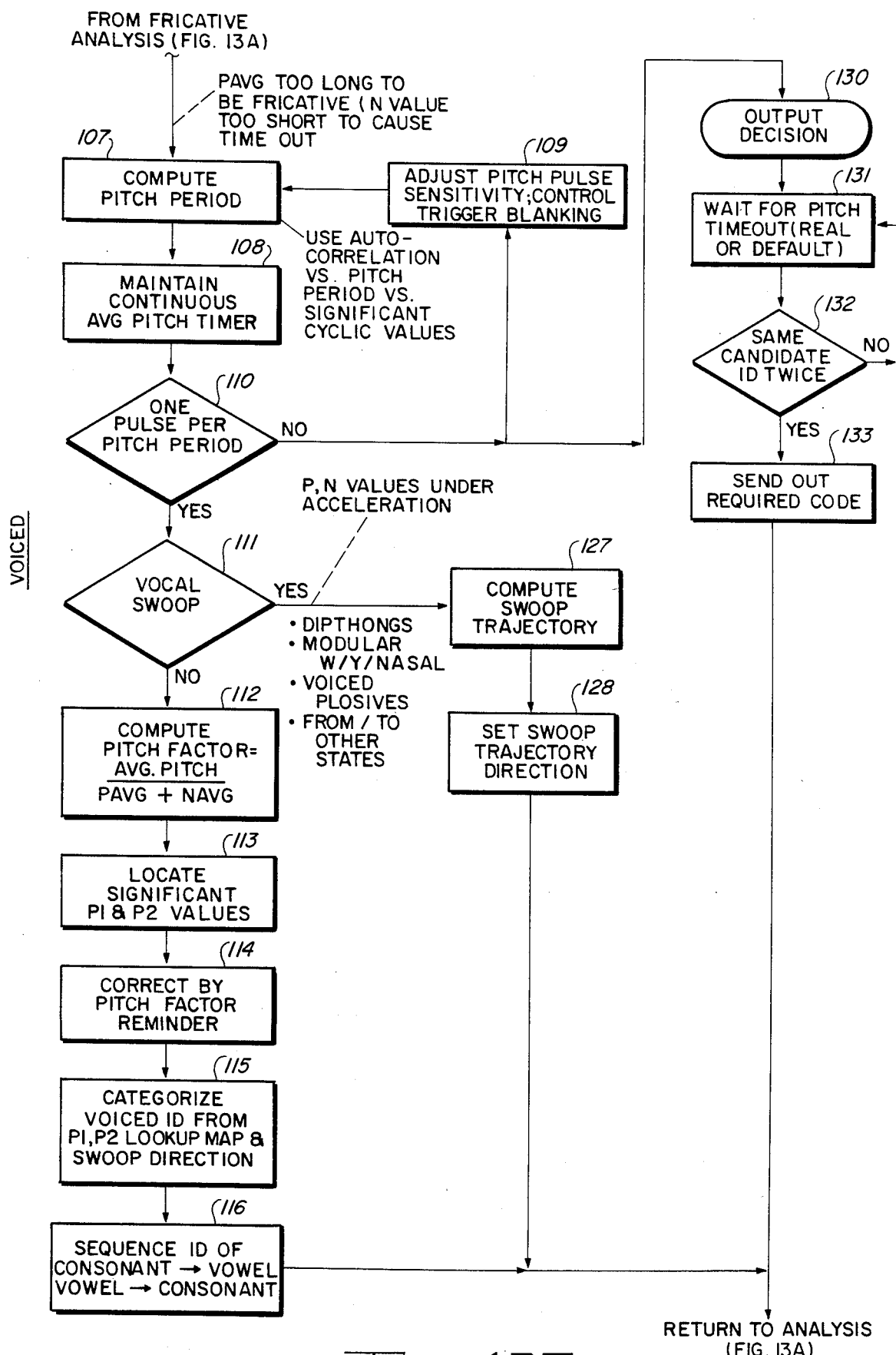
Figure 14:
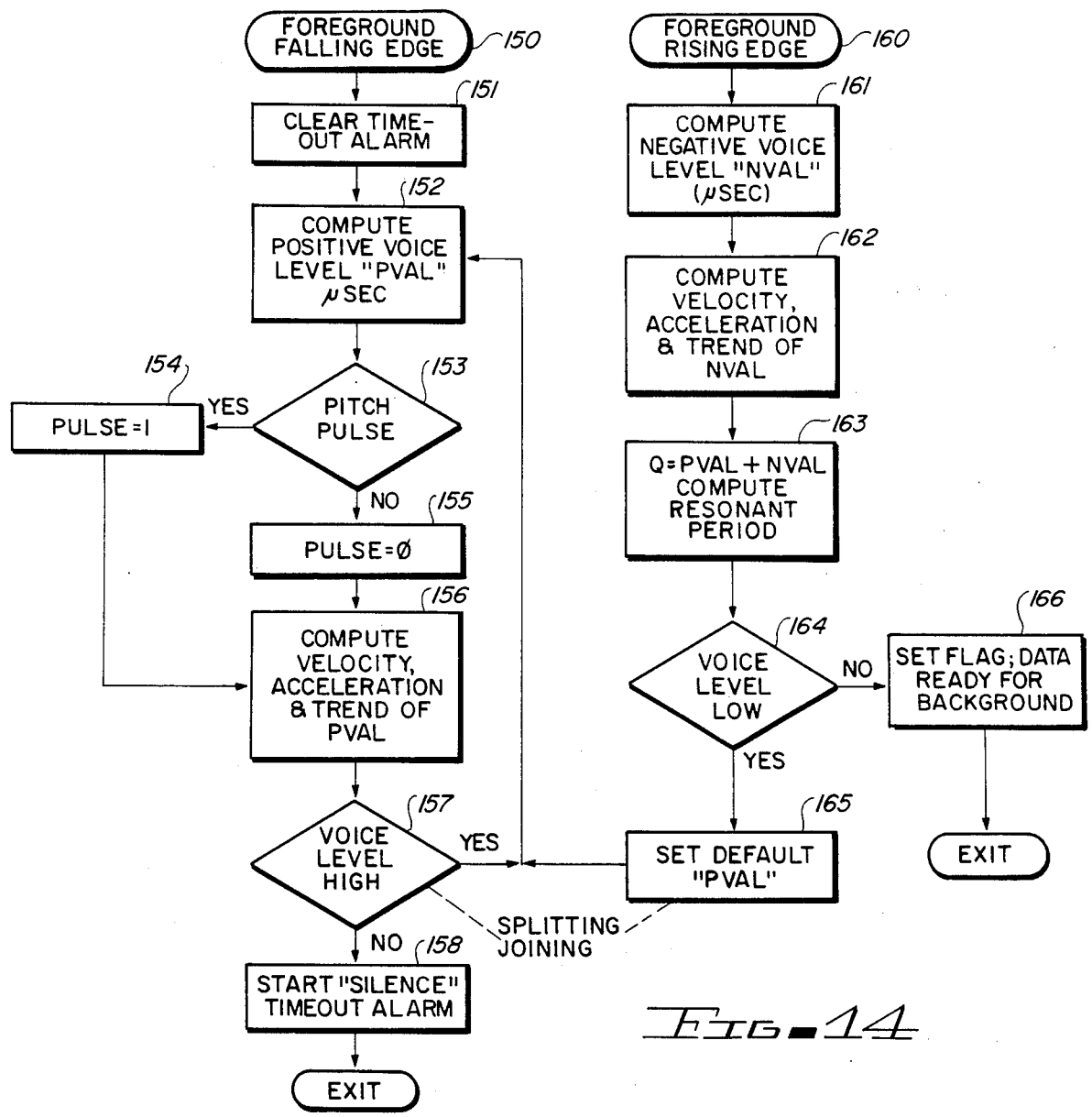
FIG. 14 is a flow chart of a program executed by the microcomputer 10 of FIG. 1 to process binary data produced by the inflection point detector circuit of FIG. 1.
Figure 16:
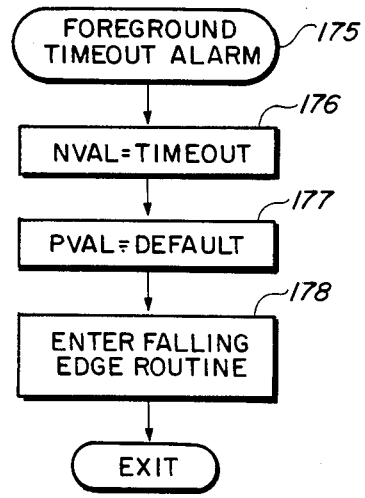
FIG. 16 is a flow chart of a subroutine executed by microcomputer 10 of FIG. 1 to compute updated values of certain variables used in the execution of the program of FIGS. 13A and 13B.

In FIGS. 13A and 13B, the program for operating on such data gathered by the "foreground" routine of FIGS. 14, 15 and 16 is entered via label 100 after the foreground analysis is finsihed. The program of FIGS. 13A and 13B goes from label 100 to decision block 101, where the program waits for the "data ready" signal from the foreground program signifying that new data is in the RAM (random access memory). If the needed data is available in the RAM, the program rapidly determines if the present data indicates a present condition of "silence", or if a fricative sound is being received, or if a voiced sound (one produced by vocal cords) is being received. If it is determined in decison block 1 that no new data has arrived, the program moves back to label 100.

However, if new data has arrived, the program goes to decision block 102. In decision block 102, if a determination is made that there is presently the condition of silence, the N value will be too long, and the program recognizes that such long values of the N duration are not possible in human speech. More specifically, the program determines that if the N duration is more than a prescribed constant, such as 5 milliseconds, then the present condition is one of silence, and the program then enters block 105 and "accumulates" silence time by counting successive "time-out" alarms until a valid P interval indicative of fricative or voicing activity is detected.

If a determination is made in decision block 118 that the present silence time is "very long", the program goes to block 117 and sets a "long silence" condition, indicating, for example that the speaker has left and, for example, the equipment can be put on a standby condition until new data arrives. If the determination of decision block 118 is that the present silence condition is not one that can be categorized as a "very long silence", the program goes to decision block 120 and determines if the criteria for a "medium silence condition" is met by the time count that has been "accumulated" in decision block 105.

Decision block 120 causes the program to determine if the accumulated silence time corresponds to a normal pause time that occurs between words and phrases in ordinary human speech. If the determination of decision block 120 is affirmative, the program goes to decision block 119 and categorizes the silence as a "pause". For example, in a word processing application, a silence of a particular length could be interpreted as meaning that a carriage return operation should be effectuated, while a shorter pause can delineate word separation. After the categorization of block 119 is complete, the program returns to label 100 and waits for new data to arrive.

If the determination of decision block 120 is negative, the program goes to decision block 122 and determines if the accumulated silence time fits into the category of being a "short silence" of the type that can be extremely useful in phoneme recognition. These short silence durations are caused by lung "pressure buildups" that occur, for example, as a result of a glottal "catch" that precedes a plosive phoneme, such as a "p" sound. Glottal catches are usually associated with the change in the position of the articulators of the mouth, throat, and tongue mechanisms that precede resuming of "voiced" sounds of speech as speech is continued. These short sound durations are typically in the range of 30 to 150 milliseconds. Durations of the "medium silence" times tested for in decision block 120 are typically large fractions of a second.

Note that the time which elapses between pitch periods, or even between positive pressure waves, is sufficiently great that microcomputer 10 usually has enough time to execute the entire flow chart of FIGS. 13A and 13B and FIGS. 14–16 between such pulses.

The prevailing speech recognition being used in the art has tended to use fast analog-to-digital conversion and then use fast mathematical analysis requiring large amounts of data storage of variables and very high instruction execution rates to accomplish phonemic analysis.

However, in my invention the unique balance of analog "hardware" with the amount of computer "software" and the speed with which it can be executed by a single chip microcomputer obviates the need for extremely fast microcomputer components.

Returning now to decision block 102, the determination of this decision block is negative if the newest "foreground" data parameters stored as variables in the random access memory contain positive pressure durations of significance persistance, for example, if PAVL is over 150 microseconds, or if PAVG is over 50 microseconds.

The program then goes to decision block 103. If the determination of decision block 103 if the PAVG positive pressure wave average duration is too short for human voicing, then the determination of decision block 103 is affirmative. This means that the sound is a fricative, a tapping or clicking sound, or some other background sound. The program then goes to decision block 104 and determines if the sound is just beginning to produce a significant PAVG time duration. If this is the case, the program goes to block 106 and bypasses some of the processing steps that are performed on comparatively long voiced sounds, because it is now known that the present sounds are unvoiced, short duration pulses. By forming a fricative identification vector consisting of PAVG for one coordinate of a vector map and NAVG for the other coordinate of the vector map, the identity of fricatives such as SH, F, TH, and so forth can be determined from a stored matrix or look-up table of the type shown in FIG. 17 and described in detail in my prior U.S. Pat. No. 4,284,846. Fricative sounds have no "voiced" components. Therefore they are speaker-independent, i.e., pitch-independent. FIG. 17 shows the typical regions where various fricatives are located, as I have empirically determined.

FIG. 17 is a vector map of the fricative regions plotting N* (NAVG) versus P* (PAVG), and is referred to in block 123 in the program of FIG. 13A. Fricatives are composed of rather short duration positive pressure waves separated by relatively long durations of inactivity or gaps between the positive pressure waves. The boundaries delineated by the dotted lines in the fricative vector map of FIG. 17 show the approximate regions where the indicated fricative sounds such as "H", "F", and the various other fricative symbols shown in FIG. 17 that are defined in my prior patent, which is incorporated by reference herein. This fricative categorization process gets carried out in block 123 of FIG. 13A. The program then goes to block 124 and assigns a predetermined code to the fricative that was identified by reference to the look-up map or table in block 123, and waits for the fricative to be completed. In decision block 125, the program determines if the present fricative is complete by waiting until either silence occurs (i.e., N exceeds a certain value) or a voiced sound occurs (i.e., PAVG exceeds a certain value). When the fricative has been completed and terminated the program goes to block 126 and re-configures the appropriate "foreground" operations of FIGS. 14–16 to the more elaborate analysis required for voiced sounds, and then returns to label 100 of FIG. 13A.

Returning now to decision block 103, if the determination of decision block 103 is that PAVG is too long for the present sound to be a fricative, then this negative determination causes the program to go to block 107 in FIG. 13B. The present sound then is probably a voiced sound, or perhaps a musical sound. In FIG. 13B, received new "foreground" data, in the form of durations of PVAL and NVAL between the various transitions of the binary waveform on conductor 9 in FIG. 1 and values of PAVG, NAVG, QAVG and the velocity DELTA P and the velocity DELTA N computed in accordance with FIGS. 14–16, are used to compute the pitch period in block 107, using an autocorrolation technique, wherein the program takes data previously computed in accordance with FIGS. 14–16 from a queue, and, using conventional autocorrolation techniques, determines if the previous pattern of received data closely matches the present pattern of received data to thereby identify repetitive or periodic matching and thereby determine the pitch period. The program, using the presently computed pitch period, goes to block 108 and updates the continuing average pitch period. This value represents the present pitch of the voiced sound being spoken. The averaging is necessary to eliminate minor "wavering" in the pitch period.

The program then goes to decision block 110 and determines if there is one pulse per pitch period. If this determination is negative, the program goes to block 109 and causes microcomputer 10 to adjust the pitch pulse sensitivity by appropriately varying the threshhold adjustment voltage on conductor 16 of FIG. 1, as well as by monitoring the clearing of the pulse latch using conductor 20 from the microcomputer 10. The program then returns to block 107.

This process repeats until the threshhold adjustment value has been varied enough, combined with the blanking of spurious trigger pulses in the reset latch, that there is one pulse per pitch period, as determined in decision block 110. If the determination of block 110 is affirmative, the program goes to decision block 111. The P values and N values obtained in voiced sounds in the data received from the RAM can undergo relatively rapid variations, especially during transition between phonemes. In block 111, the program determines if such a rapid transition is occurring, i.e., if a "vocal swoop" is occurring. If this determination is affirmative, it means that the speaker is rapidly moving his articulators, which make up the phoneme-producing structure of the speaker's speech apparatus.

The program then goes to block 127 and computes a "swoop trajectory". This can be graphically illustrated by considering a plot of the instantenous P values versus instantaneous N values, and determining if the present rate of change of the P and N values fall closest to a 0° or closest to 30° multiples of the complete 360° of possible swoop directions. This "direction" is stored and provides a rapid indication of the "directions" in which the articulators of the speaker's mouth are moving, as indicated in block 128.

These swoop trajectory directions are helpful in identifying voice plosives at the start or finish of a sequence of sounds. If the determination of decision block 111 is that a vocal swoop is not presently occuring, the program goes to block 112 and computes a pitch factor equal to the average pitch divided by a sum comprised of a running averge PAVG plus the running average NAVG. This sum represents the average reverberation cycle time of the present phoneme in the speaker's speech apparatus.

The program then goes to block 113 and, using the time of occurrence of the pitch trigger pulse, locates a "tag" on the most significant positive wave front duration times, namely P1 and P2 of the present pitch cycle. These most significant segments occur after the PITCH PULSE pointer.

In accordance with an important aspect of the invention, these individual time values of P1 and P2 are adjusted by any remainder obtained in the division computed in block 112. Block 114 indicates the making of this correction.

This step is believed to be important in establishing a high degree of speaker-independence of the phoneme recognition method of the present invention. This can be done by using the remainder of the above division to access a stored look-up table from which empiracally determined quantities can be obtained for addition to or multiplication by the P1 and P2 values. Should there be no remainder, then the reverberation sequence of the phoneme is harmonic with and exactly fits with the present pitch period, so no correction is required.

The program then goes to block 115 and, guided by the decision tree of FIG. 3, categorizes the voiced phoneme on the basis of the best match between the voiced phoneme vector domain map of FIG. 18 and the vector formed between the "adjusted" values of P1 and P2, and also on the basis of the swoop trajectory direction of block 128, and obtains a code that represents the present voiced phoneme. (Note that in block 128, the setting of the swoop trajectory direction means writing this information into random access memory, thereby making this information readily available for the steps in block 115.)

The usefullness of the swoop trajectory lies in the fact that for certain phonemes, it is not possible to determine what the prior phoneme was until the next phoneme is being uttered. For short phonemes, the real-time phoneme recognition will occur very soon after the actual utterance thereof. For rapidly spoken short fricative sounds and staccato sounds, the phoneme identification will lag by approximately one phoneme behind, because for such sounds the "total evidence" produced by the various positive pressure wave transitions, including the swoop trajectories produced during the transitions between the prior phoneme and the following one, must be converted to binary data and analyzed before correct identification of the phoneme can take place. For long, slow vowels, the identification of phonemes will be made during the time that the vowel is being uttered. Such matters are handled by block 116.

The information available to the program for phoneme identifying decisions includes information as to the existence of silence durations of the various lengths and the time of occurrence of the beginning of every pitch cycle. The program, in block 116, analyzes and uses this information, and also information regarding the presence of a fricative, information indicating the identification of the fricative. information as to the swoop trajectory direction, the pitch factor, and the remainder correction factor in order to determine the identity of the most recent phoneme from the voiced phoneme vector domain map of FIG. 18. If the same result is obtained in two consecutive pitch periods or default values of the pitch period during fricative and silence intervals, then the phoneme-identifying code will be output by microcomputer 10 to a suitable receiving device via bus 21.

This procedure is indicated in the output or executive decison routine that is entered from label 130. The step of waiting for the pitch time-out, which can be a real pitch time-out or a default value, is performed in block 131. If the same phoneme "candidate" is consecutively identified twice, the output decision is made in block 132, and the phoneme-identifying code is transmitted in accordance with block 133. A return to the background analysis occurs via return labels 134 and 100.

Referring to FIG. 18, I have empirically determined that generally increasing values of P1 indicate a moving of the tongue position from the front of the mouth to the back of the mouth, as indicated by arrow 279. Increasing values of P2 in FIG. 18 tend to indicate moving of the mouth from a relatively open or slack configuration to a closed position so that a partial fricative type of sound is produced. For example, vector 280 in FIG. 18 represents a fairly "loose" or "open" vowel. Vector 281 identifies a back vowel that is close to the point of being a fricative, for example, the germanic back vowel "hoch" the German word for high. This vector map is the one which is referred to in block 115 of the flow chart of FIG. 13B.

In the process of locating the phoneme from the voiced decision map of FIG. 18 and/or the fricative decision map of FIG. 17, empirically determined vector region boundaries have been set up which much be compared with the input vector. Each examination is carried out by means of a series of boundary comparisons that involve execution of a sequence of microcomputer instructions. Two factors which are considered in this decision process include determining the basic category of the present sound, i.e., whether it is a fricative, voiced, or mixed sound, or silence and the manner in which the look-up vector map should be searched.

The foregoing description of FIGS. 13A and 13B indicated how the basic category of sound is determined in accordance with the present invention.

Next, referring to FIG. 3, a phoneme map is shown where each branch radiating from the center of the map includes a sequence of phonemes based on their frequency of usage in average American or English speech.

The search of each branch can be done in a sequence based on this decreasing order of usage of phonemes, as represented graphically by the decreasing size of the rectangles. The probabilities, therefore, are in favor of the location of the present phoneme in the shortest average search time, usually within five matching tests. If no match is found in the course of searching from the center of the phoneme map to the end of the particular branch, the search is exited from that branch and returns to the center of the phoneme map. Then, based on broad evidence, the routine searches through the next most likely branch, etc.

The main phonemic branch "directions" radiating from the center of the phoneme map include:
East: Plosives
North: Fricatives
Northwest: Back vowels
West: Mid vowels
Southwest: Front vowels
South: Liquid, nasal sounds These techniques for matching greatly reduce search time needed to cope with other languages. Certain phonemes can be added to and/or deleted from the phoneme decision tree shown in FIG. 3. Also, new sequences based on frequency of usage in another language would be required to obtain fastest average searching.

Next, the "data gathering" activities performed by the subroutines of FIGS. 14–16 will be described. These subroutines operate on the "captured" times of occurrence of every transition of the binary waveform on conductor 9 of FIG. 1, and compute updated values of P1, P2, N1, PAVG, NAVG, DELTA P, DELTA N, etc. These subroutines are referred to as "foreground" interrupt routines, and the data they produce is referred to as "foreground data", whereas the routines of FIGS. 13A and 13B are referred to as "background" routines.

Referring to FIG. 14, a foreground subroutine executed by microromputer 10 for jumping to interrupt flags and measurirg intervals based on the binary waveform on conductor 9 is shown. This foreground subroutine performs the data acquisition function. If a falling edge of the binary waveform is received, then the time of the interrupt is automatically recorded in the capture register 11 of microcomputer 10 (FIG. 1), indicating the "1" level is over, and the subroutine is entered via label 150.

In block 151, the microcomputer 10 clears a contingency software time out alarm for long "0" durations and enters block 152. Block 152 of the program computes the duration of the just completed positive voice level or "P" value and assigns it to a variable called PVAL, measured in microseconds. The program then goes to decision block 153 and determines if there is an interrupt request signal on conductor 19 of FIG. 1. If the determination is affirmative, the program goes to block 154 and sets a variable called "PULSE" equal to a logical "1". If not, the routine goes to block 155 and sets the value of the variable "PULSE" equal to a logical "0", indicating that no pitch pulse has been recently received on conductor 19. In this case, the routine enters block 156 and computes the velocity and acceleration, and also the "trend" or running average, PAVG of the instantaneous value PAVL.

All foreground parameters are made available to the background analysis routine of FIGS. 13A and 13B when the "data ready" flag is set.

The foreground routine of FIG. 14 then enters decision block 157 and determines if the voice level has already gone back to a high level. If it has, then it is known that the duration of the present "0" level is very short. This determination is made because it is known that the sequence of events from label 150 to the end of block 156 requires a certain amount of time, and ordinarily the following edge level should not have reversed direction yet. If the direction has reversed, this indicates that "splitting" of the negative-going waveform represented by the high level presently on the binary waveform conductor 9 has occurred. If splitting has occurred, the routine goes back to block 152 and repeats the foregoing sequence of steps, in order to make a complete analysis of the positive undulation that must have occurred in the negative slope of the speech waveform.

If the determination of decision block 157 is negative, the program enters block 158, which is a software "silence" time out alarm (should the present "0" level be the start of silence) and then exits the binary waveform evaluation routine of FIG. 14. (The execution of this interruption path is designed to be as fast as possible in order to maximize the time spent in the background routine of FIGS. 13A and 13B.)

Alternatively, if a rising edge is received on the binary waveform conductor 9, label 160 of the flow chart of FIG. 14 is entered by interruption from the background routine of FIGS. 13A and 13B. This subroutine first goes to block 161 and computes the duration of the just completed "0" level and assigns it to a variable NAVL measured in microseconds. The subroutine then goes to block 162 and computes the velocity, acceleration, and trend or average value of NVAL. The program then goes to block 163 and computes the present resonance cycle duration Q, which is equal to the sum of the instantaneous values of NVAL and PVAL.

The program then goes to decision block 164. If the binary level of conductor 9 is already low, then a minimum default time of PVAL is set, as indicated in block 165, and the routine goes back to block 152. If the voice level is not low, the routine is exited.

Referring now to FIG. 15, if glottal pulse (pitch trigger) is received, the routine is entered via label 170. This routine then enters block 171 and sets a flag indicating that a pitch pulse has been detected. The routine then goes to decision block 172 to wait for "go ahead" to reset the pulse latch 15 of FIG. 1 and exits.

Referring next to FIG. 16, if there is a long duration of a "0" binary level, the time-out alarm will occur, as indicated in block 175, because of too long of a negative interval on binary waveform 9 without the ocurrence of a rising edge. If this occurs, the subroutine enters block 176 and forces NVAL to have a prescribed time out value. The program then goes to block 177, where an artificial value of PVAL is forced in order to stabilize the trend of PAVG. Next, the routine enters block 178, which forces all computation involved with the P values, and then exits.

Appendix A attached hereto is a printout of a computer program represented by the flow chart of FIGS. 13A and 13B. Similarly, Appendix B is a printout of the program represented by FIGS. 14–16.

Figure 19:
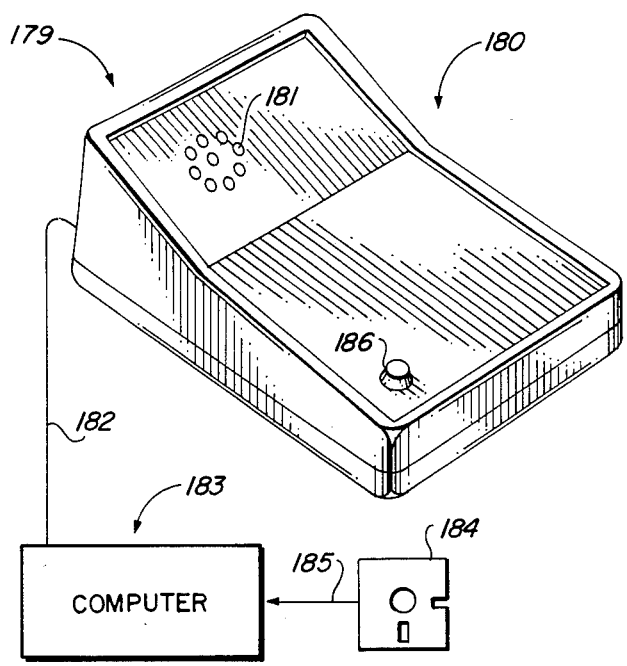
FIG. 19 is a diagram illustrating another embodiment of the invention, which provides a speaker-dependent voiced command recognition system.

In accordance with another embodiment of the invention, FIG. 19 shows a voice command module 180 which includes some of the hardware of FIG. 1, including microphone 2, microphone signal amplifier 3, audio band pass filter 5, inflection point detector 8, and a microprocessor 10 as shown in FIG. 1, but does not include the "pitch extraction" circuitry including blocks 6, 13, 15, and 18 of FIG. 1. Voice command module 180 is coupled by means of a cable 182 to a typical computer, such as a desk top computer 183.

A prompting light 186 is used to guide the speaker. The microphone 181 picks up ambient noise as well as the speaker's voice, and in general accordance with the background routine of FIG. 13A, evaluates the existing noise level to establish if an adequate low level of "silence" exists to merit making a voice record. When one half second of "silence" has been achieved, the prompting light 186 indicates to the speaker that a valid "listening" condition exists.

In this embodiment of the invention, the incoming binary waveform on conductor 9 is operated upon generally in accordance with the "foreground" subroutine previously described with reference to FIGS. 14–16. However, voice command module 180 makes no attempt to create or compare the phoneme vectors previously described. Instead, the "foreground" data, including the above-mentioned P* and N* averages are computed and are output via conductors 21 in FIG. 1, which are the conductors of the cable 182 in FIG. 19. Microprocessor 10 in the voice command module 180 outputs samples every 10 milliseconds of the P* and N* samples.

The information required to utilize this "sampled" running average data is contained in a program stored on floppy disc 184 in FIG. 19, which is then inserted into computer 183, as indicated by arrow 185. This program operates on the sampled running average data to compare it with stored "reference" data of a similar kind previously stored on floppy disc 184 in response to words spoken by the speaker whose voice commands are to be recognized during a "training session." These reference words are digitized and sampled by the voice command module 180 and stored on floppy disc 184.

The manner in which the voice command system 179 of FIG. 19 operates can perhaps be best understood by reference to a particular example. Referring now to FIG. 20, two graphs 195 and 196 are shown, which respectively represent the durations plotted against time, of the N* samples and the P* samples output on cable 182 by voice command module 180. More specifically, each ordinant of waveform 195 represents the present value of the sampled running average of the negative pressure wave portions of the incoming speech waveforms. Similarly, each ordinant of waveform 196 represents the present value of the sampled running average of the durations of the positive pressure wave portions of the incoming speech waveform.

Data showed in waveforms 195 and 196 in FIG. 20 corresponds to stored data for a particular person's utterance of the word "sappy", which is characteristic of a word with a silent interval preceding a plosive.

The program stored on floppy disc 184 (FIG. 19) operates on the data of FIG. 20 to isolate and produce data corresponding to "significant events" that can be identified from the features of waveforms 195 and 196. More particularly, these significant events include the characteristics listed in Table 2 below:

TABLE 2

| State | Symbol |
| --- | --- |
| RISE | R |
| FALL | F |
| SILENCE | S |
| DWELL | D |
| CREEP | C |

As indicated in Table 2, R designates a rapidly rising portion of the P* waveform 196. The rapidly rising portions of waveforms 196 are identified by R. Similarly, rapidly falling portions of P* graph are identified by F. S designates periods of silence.

Similarly, D and C designate portions of the P* graph which are relatively constant, and which change only very gradually, respectively.

The floppy disc 184 contains a simple routine which identifies the R states in accordance with the following formula:

$$[(P^*_n - P^*_{n-1}) + (P^*_{n+1} - P^*_n)]$$

greater than 96 microseconds, where n is the sample number.

Similarly, the state identification subroutine produces an F state in accordance with the expression $$[(P^*_n - P^*_{n-1}) + (P^*_{n+1} - P^*_n)]$$

greater than 96 microseconds

The state identification subroutine identifies the S state in accordance with the expression $$N^* > 1700 \text{ microseconds.}$$

The D state is identified in accordance with the condition that the magnitude of $P^*_n - P^*_{n-1}$ is less than or equal to 48 microseconds.

Finally, the C state is identified by determining whether P* changes slowly by at least 64 microseconds during a D state.

Occurrence of any of the above events R, F, S, D, and C are determined and the duration of each state is measured and stored in the memory of computer 183 and/or on the floppy disc 184. Occurrence of any of the above states is treated as a "event", and corresponding "event data" is gathered describing that event.

Figure 21:
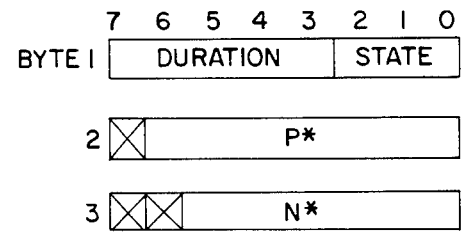
FIG. 21 is a memory map useful in describing the operation of the device of FIG. 19.

In FIG. 21, there are shown three bytes identified as bytes 1, 2, and 3, respectively, that represent the event data corresponding to one event. Byte 1 includes at least three significant bits that identify which of the five states R, F, S, D, and C have occurred. Bits 3-7 of byte 1 represent the duration of the most recent event. Byte 2 includes the value of the running average P* at the end of the present event. Byte 3 represents the present value of the running average N* at the end of the present event. The "duration" of the present state is the number of samples, each spaced 10 milliseconds from the last, that the present state lasted.

It can be seen that the foregoing approach of producing event data and specifying, in each three byte group of event data, the duration of that state obviates the need to produce data representing all of the points of time during which the corresponding state persists. This greatly reduces the amount of data which must be processed and stored, and greatly decreases the amount of time required for a processor to perform subsequent operations on the data, such as, matching it with previously stored reference data, or to reconstruct the analog signal, or to provide "narrow bandwidth" transmission of the speech data.

In accordance with one embodiment of the present invention, an important application of the foregoing technique is the accomplishment of "speaker-dependent" voice command recognition, which is achieved by the voice command system 179 of FIG. 19, wherein the event data is compared with previously stored reference data that is obtained by "training" the system, a term understood in the art to mean entry of data corresponding to particular words spoken by a particular person into the system, which words are to be later recognized as comands by the system when spoken by the same person.

Figure 22:
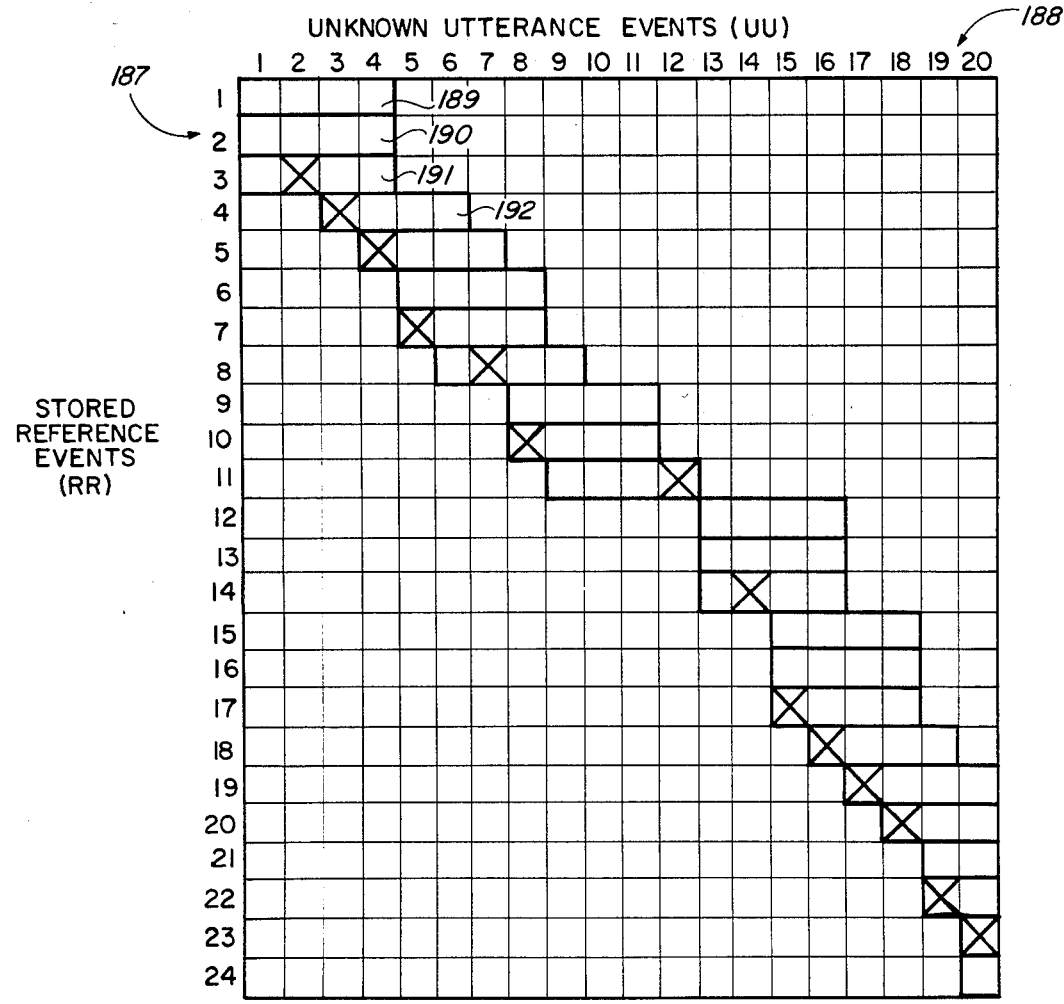
FIG. 22 is a diagram useful in explaining comparison of event data derived from a voiced command spoken into the device of FIG. 19 with stored reference event data previously spoken into the device of FIG. 19 during a "training" session.

The graph in FIG. 22 illustrates how incoming event data 188 is compared to reference event data 187 previously stored during the "training" of voice command recognition system 179. Once the spoken commands are recognized, of course, computer 183 operates in response to the commands in precisely the same way as if the commands were to be entered by means of a keyboard.

Still referring now to FIG. 22, the previously stored "reference events" 187 are plotted on the vertical axis, and are identified by event numbers, each event number 1, 2, ... 24, corresponding to a "significant event" (i.e., R, F, S, D, or C) of the voiced command "learned" by the system 179 during the "training" session. During that "training" session, the comands are spoken into the microphone 181 of the voice command module 180, resulting in "raw" sampled reference event data produced in the format of FIG. 21 and stored in a predetermined number of preselected locations on floppy disc 184.

In the course of recognizing a real-time voice command later spoken into microphone 181, "unknown" utterance events of the present real-time command being spoken are assigned similar event numbers, which event numbers 1, 2, ... 20, are generally indicated by reference numeral 188 in FIG. 20.

In FIG. 22, reference numeral 189 identifies a "window" including a group of four significant events of the present spoken word to be recognized. The event data for each of the significant events in window 189 is compared to the previously stored reference event data for stored reference event No. 1 until a matching occurs. The comparison program of FIG. 23, subsequently explained, is stored on floppy disc 184 and is executed by computer 183 to determine if any matching occurs. If a match does occur, the comparison program moves to a new "window" that begins immediately after the matching occurs. If no matching occurs, the same window of four significant unknown events of the present utterance is compared to the stored reference event data No. 2, as indicated by reference number 190 in FIG. 22.

In the example of FIG. 22, the graph indicates that no matching of the first window of four significant unknown events of the present utterance sufficiently closely matches stored reference event data No. 1 or No. 2, so the program applies the same data window to stored reference event data No. 3, as indicated by reference numeral 191. In this case, it is found that unknown event data No. 2 matches stored reference event data No. 3 by the comparison routine of FIG. 23. The X in data window 191 indicates this matching. Then, the comparison routine of FIG. 23 repeats its comparison operations for another unknown events window 192, which begins immediately after the X in window 191.

Figure 23:
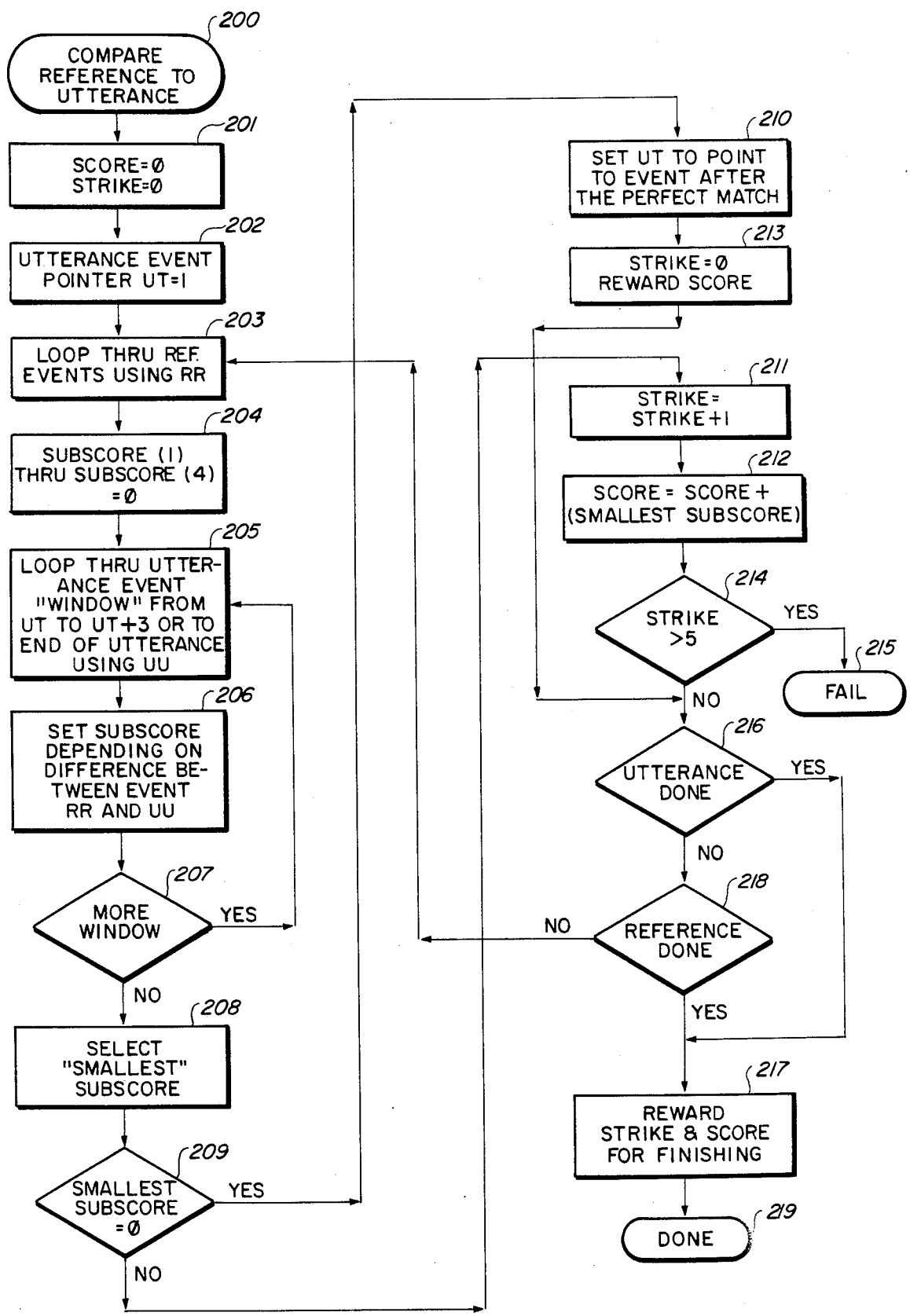
FIG. 23 is a flow chart of a program executed by acomputer to affectuate the event comparison procedure illustrated in FIG. 22.

If a predetermined number, for example six, of "mismatches" such as occurred in windows 189 and 190 occur, then the comparison routine in FIG. 23 determines that the present utterance cannot be recognized and does not match the stored reference event of 187 in FIG. 22. The routine then goes to the next stored reference word and repeats the above procedure. What this technique accomplishes is that it identifies matching features between the spoken command and the previously stored command, despite "absence" or "addition" of extraneous features that may occur each time the word is spoken. The width of the window such as 189 and 190 allows effective "synchronizing" of the comparison of the sequence of features in the presently spoken command to those in the previously stored reference command, despite these extraneous differences in the significant features of the same word when it is spoken at different times by the same speaker.

Referring next to the flow diagram of FIG. 23, which corresponds to the printout of Appendix C attached hereto, the above-mentioned signficant event comparison subroutine is entered via label 200, and goes to block 201. In block 201, two variables called SCORE and STRIKE are each set to zero. The routine then goes to block 202 and sets an utterance event pointer UT equal to 1. The routine then goes to block 203 and loops through the previously stored reference event numbers designated by reference numeral 187 in FIG. 22, incrementing a reference pointer RR, which indicates at which matching unknown utterance event to begin the next window. UU in blocks 205 and 206 points to unknown utterance events 188.

The routine then goes to block 204 and sets the value of four variables SUBSCORE(1) ... SUBSCORE(4) to zero. The later four variables correspond to "scores" which are computed for each of the four events in each of the event windows in FIG. 22.

The significant event comparison routine then goes to block 205 and loops through the present utterance event window, and, for each comparison of an utterance event in a particular window with the corresponding previously stored reference event, obtains a "difference number", assigns to it a "weighted" score, and sets the appropriate one of the variables SUBSCORE(1), etc. to that score, based on the difference between the utterance event and the stored reference event.

After the four subscore variables have values assigned to them, the routine then goes to decision block 207 and determines if there are more events in the present window. If this determination is affirmative, the routine goes back to block 205 and repeats. If the determination is negative, the routine goes to block 208 and selects the smallest of the four subscores. The routine then goes to decision block 209 and determines if the value of the smallest subscore variable is zero. If this is the case, it indicates a perfect match of the corresponding unknown utterance event with the present reference event, and the routine then goes to block 210.

In block 210, the routine sets the UT variable, which points to the first event in the window of the unknown utterance event, to point to the next event after the perfect match The routine then goes to block 213 and sets the variable STRIKE equal to zero, and also diminishes the value of the variable score by a suitable gamount to "reward" the significant event comparison routine for locating a perfect match between an unknown utterance event in the present window and the present stored reference event.

In the event that the determination of decision block 209 was negative, the routine enters block 211 and increments the variable STRIKE. The routine then goes to block 212 and adds the total amount of mismatch of each of the four utterance events in the present window to the cumulative value of SCORE.

The routine then goes to decision block 214 and determines if STRIKE exceeds 5, or another suitable empirically determined number. If this determination is affirmative, it is assumed that the present unknown utterance does not match the present stored reference utterance, and the routine is exited via block 215.

If the determination of decision block 214 is negative, the routine goes to block 216 and determines if all of the significant events of the present utterance have been compared to the stored reference event data for the present stored reference utterance. If this determination is afffirmative, the routine goes to block 217, and sets STRIKE back to zero, and also suitably diminishes or "rewards" the variable SCORE. The routine then is exited via label 219. The routine then returns to label 200 and repeats the algorithm of FIG. 23 for additional stored reference utterances to determine if any of them match the present utterance better than the just completed analysis.

If the decision of decision block 216 is negative, the routine enters decision block 218 and determines if all significant events of the present utterance have been tested against stored reference event data for the present stored reference utterance. If this determination is negative, the routine goes back to block 203, but otherwise goes to block 217 and then exits via label 219.

The "rewards" used in block 217 are required in case some other word in the lexicon has a similar or identical sequence in the early part of matching, but exhibits a discrepant latter part. Any word which finishes the algorithm of FIG. 23 therefore has a large reduction in the accumulated score (such as a reduction of one half) in order to portray or encourage a favorable final decision when the scores of all matched words are evaluated.

FIG. 24 illustrates another implementation of the system shown in FIG. 1, wherein blocks 5, 6, 8, 13, 15, and 18 are omitted, and their functions are performed or accomplished by means of a high speed analog to digital converter of the type referred to in the art as a "flash analog to digital converter", and by means of two digital filter programs. More specifically, in FIG. 24, the system 285 includes a microphone 289, a microphone amplifier 290, the output of which is applied as an analog input to a microcomputer 286. Microcomputer 286 includes a processor 292, which can be implemented by means of any of a large number of presently commercially available microprocessors. It is coupled to a digital bus 293, which can include the bus 21 in FIG. 1 on which phoneme identification signals are provided, or it can simply provide sampled, compact digital representation of information of the type conducted on cable 182 in the embodiment of FIG. 19.

Computer 286 includes a flash analog to digital converter 288, which can be implemented by means of several commercially available analog to digital converters that are capable of performing conversions in roughly 30 microseconds or less. Microprocessor 292 executes two digital filter routines, which are schematically indicated in FIG. 24 by block 287. Dotted line 296 schematically represents the execution of the two digital filter routines 287 by microprocessor 292. Reference numeral 282 represents an RC time constant circuit which is coupled by conductor 283 to digital circuitry within microcomputer 286 which much be provided and controlled by microprocessor 292 in order to execute the two digital filter routines. One of the two digital filter routines and associated digital filter circuitry performs the function of digitally filtering the voice band components of the analog signal on conductor 291. It performs the function of the audio band pass filter 5 in FIG. 1. Reference numeral 284 represents an RC time constant circuit which is coupled by conductor 295 to additional digital filtering circuitry which is controlled by microprocessor 292 in the course of executing the second digital filter routine in block 287, to provide a properly filtered pitch band signal. This circuitry and digital filter routine perform the function of the pitch band pass filter 6 in FIG. 1.

It is within the present capability of the art (although it is believed not yet to have been done) to integrate a flash analog to digital converter such as 288 and a microprocessor such as 292 and additional digital filtering circuitry onto a single integrated circuit chip. This would be a straight-forward, economical method of implementing large portions of the system of FIG. 1.

Microprocessor 292 could easily execute a subroutine which would look at the outputs of the flash analog to digital converter 288 and could easily perform a comparison of each point of the output with the adjacent points thereof to detect the peaks of the analog speech waveform produced on conductor 291. It would be a straight-forward matter for the microprocessor to then mathematically determine the major inflection points and compute all of the various running averages, rates of change, and acceleration variables that have been previously described herein. The undesired "intervening" numbers produced by analog to digtal converter 288 could be discarded, to achieve the same degree of significant event data compaction previously described herein.

While the invention has been described with reference to a particular embodiment thereof, those skilled in the art will be able to make various modifications to the disclosed embodiment without departin from the true spirit and scope thereof. It is intended that all elements and steps which perform substantially the same function in substantially the same manner to obtain substantially the same result are within the scope of the present invention.

*** APPENDIX A ***

```
/*                                                              */
/*    K. Marley                                                 */
/*                                                              */
/*    Real-time, Pitch Synchronous, Speaker Independent, Phonetic */
/*    Speech Recognition Program useful in implementing the    */
/*    Background Analysis of Fig. 13A and Fig. 13B.            */
/*                                                              */

Procedure OUTPUT( TOKEN );
    call wait_for_picth_time_out;
    if not( TOKEN = LAST_TOKEN ) then do
        write encoded( TOKEN );
        LAST_TOKEN := TOKEN;
    enddo;
return procedure BACKGROUND;
    FRICATIVE_BEGINS := false;
    SILENCE_COUNT := 0;
    LAST_TOKEN := null;
    enable RISING_EDGE interrupt;
    enable FALLING_EDGE interrupt;
    enable ALARM_TIME_OUT interrupt;
    whenever DATA_READY_FLAG = true do
        DATA_READY_FLAG := false;

if state(PAVG,NAVG) = 'silence' then do
            SILENCE_COUNT := SILENCE_COUNT + 1
            if SILENCE_COUNT => 'high' then call OUTPUT('silence');
            if SILENCE_COUNT => 'medium' then call OUTPUT('pause');
            if SILENCE_COUNT => 'low' then call OUTPUT('catch');
        enddo; /* Silence */
```

```
      elseif state( PAVG, NAVG ) = 'fricative' then do
         SILENCE_COUNT := 0;
         if FRICATIVE_BEGINS = false then do
            FRICATIVE_BEGINS := true;
            call speed_up_foreground_data_acquisition;
         enddo;
         elseif FRICATIVE_BEGINS = true then do
            TOKEN := fricative_look_up(PAVG,NAVG);
            call wait_for_end_of_fricative;
            call OUTPUT( TOKEN );
            FRICATIVE_BEGINS := false;
         enddo;
   enddo; /* Fricative */
         elseif state(PAVG,NAVG) = 'voiced' then do
            PULSE_COUNT := count( PULSE );
            PITCH_TIME := pitch_duration( PULSE,CURRENT_TIME );
            PITCH_AVG  := running_average( PITCH_TIME );
            if (PITCH_AVG / PULSE_COUNT) > 1.0 then decrease_pitch_gain;
            if (PITCH_AVG / PULSE_COUNT) < 1.0 then increase_pitch_gain;
            call pitch_blanking( PITCH_AVG );
            if vocal_swoop( P_TREND,N_TREND ) = true then do
               SWOOP_VECTOR := swoop( P_TREND,N_TREND );
            enddo;
            else do /* Voice Stable */
               PITCH_FACTOR := PITCH_AVG / (PAVG + NAVG);
               call locate( P1, P2 );
               NEW_P1 := correction( PITCH_FACTOR, P1 );
               NEW_P2 := correction( PITCH_FACTOR, P2 );
               TOKEN := vowel_look_up( P1, P2, SWOOP_VECTOR );
               call OUTPUT( TOKEN );
            enddo;
         enddo; /* Vowel */
      enddo; /* whenever */
   return; /* BACKGROUND */
                      **** APPENDIX B *****

/*                                                                   */
/*    K. Marley                                                      */
/*                                                                   */
/*    Real-time, Pitch Synchronous, Speaker Independent, Phonetic    */
/*    Speech Recognition Program useful in Implementing the          */
/*    Foreground Analysis of Fig. 14, Fig. 15 and Fig. 16.           */
/*                                                                   */
/* ================================================================= */
procedure FALLING_EDGE;
   disable TIME_OUT_ALARM;
   PVAL := CURRENT_TIME - LAST_EDGE_TIME;
   LAST_EDGE_TIME := CURRENT_TIME;

COMPUTE_P:
   if PITCH_PULSE = 1B1 then
      PULSE = 1;
   else
      PULSE = 0;
   PAVG := running_average(PVAL);
   P_TREND := trend(PAVG);
   if VOICE_LEVEL = 1B1 then goto COMPUTE_P;
   TIME_OUT := LAST_EDGE_TIME + usec(6000);
   enable TIME_OUT_ALARM;
   return;
/* ================================================================= */
procedure RISING_EDGE;
   NVAL := CURRENT_TIME - LAST_EDGE_TIME;
   LAST_EDGE_TIME := CURRENT_TIME;
   NAVG := running_average( NVAL );
   N_TREND := trend( NAVG );
   Q := PVAL + NVAL;
   if VOICE_LEVEL = 1B0 then do
      PVAL := DEFAULT_PVAL;
      goto COMPUTE_P;
   enddo;
   DATA_READY_FLAG := true;
```

```
    return;
/* ================================================================ */
procedure ALARM_TIME_OUT;
    CURRENT_TIME := TIME_OUT;
    PVAL := DEFAULT_PVAL;
    call FALLING_EDGE;
    return;
```

*** APPENDIX C ***

```
/*                                                                  */
/*  K. Marley                                                       */
/*                                                                  */
/*                                                                  */
/*  A Voice Command Comparison Algorithm Having Compact             */
/*  Significant Feature Data.                                       */
/*                                                                  */
/*  Procedure CRUNCH is useful in implementing the Procedure        */
/*  for Operating on the Data in Fig. 20 to generate                */
/*  Significant Event Data as in Fig. 21.                           */
/*                                                                  */
/*  Procedure COMPARE is useful in implementing the Comparison      */
/*  of Incoming Event Data to Reference Event Data in Fig. 22,      */
/*  and the Flowchart in Fig. 23.                                   */
/*                                                                  */
/*  QUEUE( 1, n ) -- Last sample                                    */
/*  QUEUE( 2, n ) -- Current sample                                 */
/*  QUEUE( 3, n ) -- Next sample                                    */
/*                  QUEUE( i, 1 ) -- P value                        */
/*                  QUEUE( i, 2 ) -- N value                        */
/*                  QUEUE( i, 3 ) -- Delta P                        */
/* ================================================================ */ procedure STORE_EVENT( P, N, LAST_STATE );
    array QUEUE( 1..3, 1..3 ), P_BUFFER( 1..BUFFER_SIZE );
    array N_BUFFER( 1..BUFFER_SIZE );
    DURATION := BUFFER_INDEX - LAST_INDEX;
    write ( DURATION, LAST_STATE, P, N );
    LAST_P_OUTPUT := P;
    LAST_INDEX := BUFFER_INDEX;
return;

/* ================================================================ */
procedure CALCULATE;
    for I := 1 to 2 do      /* Shift the QUEUE */
        for J := 1 to 3 do
            QUEUE( I, J ) := QUEUE( I+1, J );
        enddo;
    enddo;
    QUEUE( 3, 1) := P_BUFFER( BUFFER_INDEX );
    QUEUE( 3, 2) := N_BUFFER( BUFFER_INDEX );
    QUEUE( 3, 3) := QUEUE( 3, 1) - QUEUE( 2, 1 );
    BUFFER_INDEX := BUFFER_INDEX + 1;
    /* Determine the current state                  */
    if QUEUE( 2, 1 ) <= P_SILENCE_THRESHOLD and
       QUEUE( 2, 2 ) >= N_SILENCE_THRESHOLD then do
            CURRENT_STATE := 'silence';
            return;
    enddo;
    if abs( QUEUE( 2, 3 )) <= DWELL_THRESHOLD then do
        CURRENT_STATE := 'dwell';
        return;
    enddo;
    if QUEUE( 2, 3 ) + QUEUE( 3, 3 ) >= RISE_THRESHOLD then do
        CURRENT_STATE := 'rise';
        return;
    enddo;
    if QUEUE( 2, 3 ) + QUEUE( 3, 3 ) <= FALL_THRESHOLD then do
        CURRENT_STATE := 'fall';
        return;
    enddo;
return; /* end of CALCULATE */

/* ================================================================ */
```

```
procedure CRUNCH;
    BUFFER_INDEX := 1;    /* Initialize */
    SILENCE_COUNT := 0;  LAST_P_COUNT := 0;
    LAST_INDEX := 1;
    for I := 1 to 3 do
        QUEUE( I, 1 ) := P_SILENCE_THRESHOLD;
        QUEUE( I, 2 ) := N_SILENCE_THRESHOLD;
        QUEUE( I, 3 ) := 0;
    enddo;
    /* Seed the QUEUE */
    call CALCULATE;   call CALCULATE;
    while CURRENT_STATE = 'silence' do
        call CALCULATE;
    enddo;
    LAST_STATE := CURRENT_STATE;  LAST_DWELL_P := QUEUE( 2, 1 );
    call STORE_EVENT( QUEUE( 2, 1 ), QUEUE( 2, 2 ), CURRENT_STATE );
    goto STATE_CASE;
    /* Process */
    while not( END_OF_BUFFER ) or SILENCE_COUNT < TERMINATE_THRESHOLD then do
        call CALCULATE;
        STATE := LAST_STATE;

CASE_STATE:
        if STATE = 'rise' do
            if CURRENT_STATE <> 'rise' then do
                call STORE_EVENT( QUEUE( 2, 1 ), QUEUE( 2, 2), LAST_STATE );
                STATE := CURRENT_STATE;
                goto CASE_STATE;
            enddo;
        enddo;
        elseif STATE = 'fall' do
            if CURRENT_STATE <> 'fall' then do
                call STORE_EVENT( QUEUE( 2, 1 ), QUEUE( 2, 2), LAST_STATE );
                STATE := CURRENT_STATE;
                goto CASE_STATE;
            enddo;
        enddo;
        elseif STATE = 'silence' do
            if CURRENT_STATE = 'silence' and LAST_STATE <> 'silence' then
                SILENCE_COUNT := 1;
            elseif CURRENT_STATE = 'silence' and LAST_STATE = 'silence' then
                SILENCE_COUNT := SILENCE_COUNT + 1;
            otherwise do
                call STORE_EVENT( P_SILENCE_THRESHOLD, N_SILENCE_THRESHOLD,
                                                       LAST_STATE );
                SILENCE_COUNT := 0;
                STATE := CURRENT_STATE;
                goto CASE_STATE;
            enddo;
        enddo;
          elseif STATE = 'dwell' do
              if CURRENT_STATE = 'dwell' and LAST_STATE <> 'dwell' then
                  LAST_DWELL_P := QUEUE( 2, 1 );
              elseif CURRENT_STATE = 'dwell' and LAST_STATE = 'dwell' then do
                  if abs(QUEUE( 3, 3 )) <= DWELL_THRESHOLD and
                     abs(LAST_DWELL_P - QUEUE( 2, 1 )) >= CREEP_THRESHOLD then do
                      call STORE_EVENT( QUEUE( 2, 1), QUEUE( 2, 2 ), 'creep' );
                      LAST_DWELL_P := QUEUE( 2, 1 );
                  enddo;
              enddo;
              otherwise do
                  call STORE_EVENT( QUEUE( 1, 1 ), QUEUE( 1, 2 ), LAST_STATE );
                  STATE := CURRENT_STATE;
                  goto CASE_STATE;
              enddo;
          enddo; /* dwell */
          LAST_STATE := CURRENT_STATE;
    enddo; /* while */
return;     /* end CRUNCH */

/* ================================================================ */
procedure COMPARE( REFERENCE, UTTERANCE );
```

```
/*   REFERENCE( n, 1 ) -- State                                    */
/*   REFERENCE( n, 2 ) -- Duration                                 */
/*   REFERENCE( n, 3 ) -- P value                                  */
/*   REFERENCE( n, 4 ) -- N value                                  */
/*   UTTERANCE( n, 1..4 ) -- has same configuration                */ array REFERENCE(1..REF_LENGTH,1..4 ), UTTERANCE(1..UTT_LENGTH,1..4 );
array SUBSCORE( 0..3 );
SCORE := 0;     STRIKE := 0
UT := 1;  /* Index to start of comparison window */
for RR := 1 to REF_LENGTH do
     for I := 0 to 3 do SUBSCORE( I ) := null; enddo;
     UE := 3;  /* UE is the end of the comparison window */
     if UT + UE > UTT_LENGTH then UE := UTT_LENGTH - UT;
     for UU := 1 to UE do
          SUBSCORE( UT ) := difference(REFERENCE(RR,n), UTTERANCE(UT+UE,n));
     enddo;  /* end of window loop */
     SMALLEST_SUBSCORE := min( SUBSCORE( 0..3 ) );
     if SMALLEST_SUBSCORE <= PERFECT_MATCH_THRESHOLD then do
          UT := UT + index_of( min( SUBSCORE( 0..3 ))) + 1;
          STRIKE := 0;
          SCORE := truncate( SCORE / 2 );  /* Reward SCORE */
     enddo;
     otherwise do
          STRIKE := STRIKE + 1;
          SCORE := SCORE + SMALLEST_SUBSCORE;
          if STRIKE > 5 then return( 'fail' );  /* 6 strikes you're out */
     enddo;
     if UT >= UTT_LENGTH then undo;  /* jump out of RR loop */
enddo;  /* RR loop */
SCORE := truncate( SCORE / 2 );  /* Reward score for finishing */
return;  /* end COMPARE */
```

I claim:

1. A method of transforming a sound signal having positive pressure wave portions and negative pressure wave portions into character signals, said method comprising the steps of:
   (a) producing an analog signal representing said sound signal;
   (b) producing a binary signal having a "1" level during positive pressure wave portions of said sound signal and a "0" level during negative pressure wave portions of said sound signal;
   (c) detecting the peak amplitude of each pitch cycle of said analog signal and producing a pitch cycle marker signal synchronized to a maximum peak amplitude portion of said analog signal;
   (d) producing a first number that represents the duration of a "1" level of said binary signal most closely following a pulse of said pitch cycle marker signal and producing a second number that represents the duration of the next most closely following "1" level of said binary signal;
   (e) producing a character vector having a magnitude and a direction from said first and second numbers and comparing said character vector with a plurality of stored vectors to determine if said character vector matches any of said stored vectors; and
   (f) producing a character signal representing a sound corresponding to a one of said stored vectors that matches said character vector.

2. The method of claim 1 including producing a running average of the durations of said "1" levels and said "0" levels of a plurality of said pitch cycles of said analog signal and also producing a summation of the durations of said "1" and "0" levels of one pitch cycle, dividing said summation by the sum of said running averages of said "1" and "0" durations, and, if there is a remainder, using said remainder to obtain a correction factor to effectuate a correction in said character vector.

3. The method of claim 2 including applying said correction factor to said durations of one of said "1" levels.

4. The method of claim 2 wherein said using said correction factor effectuates correcting of said character vector to a value which said character vector would have if the pitch period of said one pitch cycle were equal to the said sum of said running averages of said "1" levels and said "0" levels.

5. The method of claim 1 including comparing durations of succeeding initial "1" levels to durations of later occurring "1" levels to determine the change or rate of change of said durations of said "1" levels, and, if said change or rate of change falls within a predetermined range of values, producing a character demarcation signal representing a beginning or end of a character sound represented by said sound signal.

6. The method of claim 3 wherein said correction factor is obtained by using said remainder to address a look-up table to obtain said correction factor.

7. The method of claim 3 wherein said sound signal includes a voiced sound portion, and wherein steps (d), (e) and (f) apply to said voiced sound portion.

8. The method of claim 7 wherein said sound signal includes a fricative portion, said method including computing a first running average of said first numbers and a second running average of said second numbers, and computing a fricative character vector between said first and second running averages, and comparing said fricative character vector with a plurality of stored fricative vectors to determine if said fricative character vector matches any of the stored fricative vectors, and producing a character signal representing a fricative corresponding to a one of said stored fricative vectors that matches said fricative character vector.

9. The method of claim 7 wherein said voiced sound portion includes a plosive portion and a silent portion immediately preceeding said plosive portion, said method including the steps of measuring the duration of said silent interval and comparing that duration with a plurality of stored durations, and, if the compared duration matches any of the stored durations, producing a signal that is at least partly indicative of the type of the plosive portion.

10. The method of claim 1 wherein said character signals each represent a different phoneme contained in said sound signal.

11. A system for transforming a sound signal having positive pressure wave portions and negative pressure wave portions into character signals, said system comprising:
(a) means for producing an analog signal representing said sound signal;
(b) means responsive to said analog signal producing means for producing a binary siganl having a "1" level during positive pressure wave portions of said sound signal and a "0" level during negative pressure wave portions of said sound signal;
(c) means reponsive to said analog signal producing means for detecting the peak amplitude of each pitch cycle of said analog signal and producing a corresponding pitch cycle marker signal synchronized to a maximum peak amplitude portion of said analog signal;
(d) means responsive to said binary signal for producing a first number that represents the duration of a "1" level of said binary signal most closely following a pulse of said pitch cycle marker signal and producing a second number that represents the duration of the next most closely following "1" level of said binary signal;
(e) means for producing a character vector having a magnitude and a direction from said first and second numbers and comparing said character vector with a plurality of stored vectors to determine if said character vector matches any of said stored vectors; and
(f) means for producing a character signal representing a sound corresponding to a one of said stored vectors that matches said character vector.

12. The system of claim 11 including means for producing a running average of the durations of said "1" levels and said "0" levels of a plurality of said pitch cycles of said analog siganl, producing a summation of the durations of said "1" and "0" levels of one pitch cycle, for dividing said summation by the sum of said running averages of said "1" and "0" durations, and means for using said remainder to obtain a correction factor to effectuate a correction in said character vector if there is a remainder.

13. The system of claim 12 including means for applying said correction factor to said durations of one of said "1" levels.

14. The system of claim 12 wherein said means for using said correction factor effectuates correcting of said character vector to a value which said character vector would have if the pitch period of said one pitch cycle were equal to said sum of said running averages of said "1" levels and said "0" levels.

15. The system of claim 11 including means for comparing durations of succeeding initial "1" levels to durations of later occuring "1" levels to determine the change or rate of change of said durations of said "1" levels, and means for producing a character demarcation signal representing a beginning or end of a character sound represented by said sound signal if said change or rate of change falls within a predetermined range of values.

16. The system of claim 13 including means for obtaining said correction factor by using said remainder to address a look-up table.

17. The system of claim 13 wherein said sound signal includes a voiced sound portion.

18. The system of claim 17 wherein said sound signal includes a fricative portion, said system including means for computing a first running average of said first numbers and a second running average of said second numbers, and means for computing a fricative character vector between said first and second running averages, and means for comparing said fricative character vector with a plurality of stored fricative vectors to determine if said fricative character vector matches any of the stored fricative vectors, and means for producing a character signal representing a fricative corresponding to a one of said stored fricative vectors that matches said fricative character vector.

19. The system of claim 17 wherein said voiced sound portion includes a plosive portion and a silent portion immediately preceeding said plosive portion, said system including means for measuring the duration of said silent interval and means for comparing that duration with a plurality of stored durations, and means for producing a signal that is at least partly indicative of the type of the plosive portion if the compared duration matches any of the stored duratons.

20. The system of claim 11 wherein said character signals each represent a different phoneme contained in said sound signal.

21. A method of transforming positive pressure waves and negative pressure waves from a sound signal into phoneme identification signals, said method comprising the steps of:
(a) producing an analog signal representative of said sound signal;
(b) producing a first bandwidth-limited analog signal representing said sound signal in response to said analog signal;
(c) producing a binary signal having a "1" level during positive pressure wave portions of said sound signal and a "0" level during negative pressure wave portions of said sound signal;
(d) concurrently, producing, in response to said analog signal, a second bandwidth-limited analog sound signal representing low frequency components of said analog signal for detecting the peak amplitude of each pitch cycle of said analog signal and producing a pitch cycle marker signal synchronized to a maximum peak amplitude portion of said analog signal;
(e) producing a first number that represents the duration of a "1" level of said binary signal most closely following the onset of said pitch cycle marker signal and producing a second number that represents the duration of the next most closely following "1" level of said binary signal;
(f) producing a character vector having a magnitude and a direction from said first and second time duration numbers and comparing said character vector with a stored map composed of a plurality of vector boundary regions to determine which of the said vector boundary regions contains said character vector; and
(g) producing a phoneme identification signal representing a sound corresponding to a one of said stored vector regions that matches said character vector.

22. The method of claim 21 including producing a running average of the durations of all successive ones of said "1" levels of said binary signal and a running average of all successive ones of said "0" levels of said binary signal and also producing a summation of the durations of said "1" and "0" levels within each pitch cycle to represent the instantaneous pitch time period, dividing said summation by the sum of said running averages of said "1" and "0" durations, and, if there is a remainder, using said remainder to obtain a correction factor to be applied to one or both of said first and second time duration numbers or to said character vector.

23. The method of claim 22 including applying said correction factor prior to said producing of said character vector and prior to said comparing with the stored map of vector boundary regions.

24. The method of claim 23 wherein said applying of said correction factor effectuates correcting of said character vector to a value which said character vector would have if the pitch period of said one pitch cycle were equal to an exact integer multiple of said running averages of said "1" levels and said "0" levels.

25. The method of claim 21 including comparing durations of succeeding initial "1" levels to durations of the later occuring "1" levels to determine the change or rate of change of said durations of said "1" levels, and, if said change or rate of change falls within a predetermined range of values, producing a demarcation signal representing a beginning or end of a relatively stable phoneme.

26. The method of claim 23 wherein said correction factor is obtained by using said remainder to address a look-up table to obtain said correction factor.

27. The method of claim 22 wherein said sound signal includes a voiced sound portion, and wherein steps (d), (e) and (f) apply to said voiced sound portion.

28. The method of claim 27 wherein said sound signal includes a fricative portion, said method including computing a first running average of said first numbers and a second running average of said second numbers, and forming a fricative vector between said first and second running averages, and comparing said fricative vector with a stored map composed of a plurality of vector boundary regions to determine if said fricative vector falls within any of the stored fricative vector boundary regions, and producing a phoneme or sound identifying signal representing a fricative corresponding to a one of said stored fricative vector regions.

29. The method of claim 27 wherein said voiced sound portion includes a plosive portion and a silent portion immediately preceding said plosive portion, said method including the steps of measuring the duration of said silent portion and comparing that duration with a plurality of stored durations and producing a signal useful in determining to which of a plurality of plosive phonemes said plosive portion corresponds.

30. The method of claim 27 wherein if either said change or said rate of change exceeds a predetermined value, a velocity slope vector is formed to determine a trajectory useful in predicting from what vector boundary region the voiced character vector came from and/or to which vector boundary region the voiced character vector is going in order to assist in identifying very short duration phonemes.

31. A system for transforming positive pressure waves and negative pressure waves from a sound signal into phoneme identification signals, said system comprising:
(a) means responsive to said sound signal for producing an analog signal representative of said analog signal;

(b) means responsive to said analog signal for producing a first bandwidth-limited analog signal representing said sound signal in response to said analog signal;
(c) means responsive to said bandwidth-limited analog signal for producing a binary signal having a "1" level during positive pressure wave portions of said sound signal and a "0" level during negative pressure wave portions of said sound signal;
(d) means responsive to said analog signal for producing a second bandwidth-limited analog sound signal representing low frequency components of said analog signal;
(e) means responsive to said second bandwidth-limited analog signal for detecting the peak amplitude of each pitch cycle of said analog signal and producing a pitch cycle marker signal synchronized to a maximum peak amplitude portion of said analog signal;
(f) means responsive to said binary signal for producing a first number that represents the duration of a "1" level of said binary signal most closely following the onset of said pitch cycle signal and producing a second number that represents the duration of the next most closely following "1" level of said binary signal;
(g) means for producing a character vector from said first and second time duration numbers and means for comparing said character vector with a stored map composed of a plurality of vector boundary regions to determine which of the said vector boundary regions contains said character vector; and
(h) means for producing a phoneme identification system representing a sound corresponding to a one of said stored vector regions that matches said character vector.

32. The system of claim 31 including means for producing a running average of the durations of all successive ones of said "1" levels of said binary signal and a running average of all successive ones of said "0" levels of said binary signal, means for producing a summation of the durations of said "1" and "0" levels within each pitch cycle to represent the instantaneous pitch time period, means for dividing said summation by the sum of said running averages of said "1" and "0" durations, and means for using said remainder to obtain a correction factor to be applied to one or both of said first and second duration numbers or to said character vector if there is a remainder.

33. The system of claim 32 including means for applying said correction factor prior to said producing of said character vector and prior to said comparing with the stored map of vector boundary regions.

34. The system of claim 33 wherein said means for applying said correction factor effectuates correcting of said character vector to a value which said character vector would have if the pitch period of said one pitch cycle were equal to an exact integer multiple of said running averages of said "1" levels and said "0" levels.

35. The system of claim 31 including means for comparing durations of succeeding initial "1" levels to durations of the later occuring "1" levels to determine the change or rate of change of said durations of said "1" levels, and means for producing a demarcation signal representing a beginning or end of a relatively stable phoneme if said change or rate of change falls within a predetermined range of values.

36. The system of claim 33 wherein said correction factor is obtained by using said remainder to address a look-up table to obtain said correction factor.

37. The system of claim 32 wherein said sound signal includes a voiced sound portion.

38. The system of claim 37 wherein said sound signal includes a fricative portion, said system including means for computing a first running average of said first numbers and a second running average of said second numbers, means for forming a fricative vector between said first and second running averages, means for comparing said fricative vector with a stored map composed of a plurality of vector boundary regions to determine if said fricative vector falls within any of the stored fricative vector boundary regions, and means for producing a phoneme or sound identifying signal representing a fricative corresponding to a one of said stored fricative vector regions that said character vector matches.

39. The system of claim 35 wherein said voiced sound portion includes a plosive portion and a silent portion immediately preceding said plosive portion, said system including means for measuring the duration of said silent portion, means for comparing that duration with a plurality of stored durations, and means for producing a signal useful in determining which of a plurality of plosive phonemes said plosive portion corresponds to.

40. The system of claim 35 means for producing a velocity slope vector to determine a trajectory useful in predicting from which vector boundary region the voiced character vector came from and/or to which vector boundary region the voiced character vector is going in order to assist in identifying very short duration phonemes if either said changes or said rate of change exceeds a predetermined value.

* * * * *

UNITED STATES PATENT AND TRADEMARK OFFICE
CERTIFICATE OF CORRECTION

PATENT NO. : 4,783,807
DATED : Nov. 8, 1988
INVENTOR(S) : John Marley

It is certified that error appears in the above-identified patent and that said Letters Patent are hereby corrected as shown below:

On the first page, application number "844,769" should be deleted, and application number "644,769" should be added.

Signed and Sealed this

Eighteenth Day of April, 1989

Attest:

DONALD J. QUIGG

*Attesting Officer*     Commissioner of Patents and Trademarks